(12) United States Patent
Takasaki

(10) Patent No.: US 7,926,602 B2
(45) Date of Patent: Apr. 19, 2011

(54) STRUCTURE FOR MOUNTING BATTERIES ONTO ELECTRIC VEHICLES

(75) Inventor: Seiichi Takasaki, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 553 days.

(21) Appl. No.: 12/005,421

(22) Filed: Dec. 27, 2007

(65) Prior Publication Data

US 2008/0173488 A1 Jul. 24, 2008

(30) Foreign Application Priority Data

Dec. 28, 2006 (JP) ................................. 2006-356364

(51) Int. Cl.
*B60R 16/04* (2006.01)
*B60W 10/24* (2006.01)
(52) U.S. Cl. ..................................... 180/68.5; 180/65.29
(58) Field of Classification Search .................. 180/68.5, 180/65.29
See application file for complete search history.

(56) References Cited

U.S. PATENT DOCUMENTS

| | | | | |
|---|---|---|---|---|
| 5,392,873 A | * | 2/1995 | Masuyama et al. | 180/68.5 |
| 5,534,364 A | * | 7/1996 | Watanabe et al. | 429/61 |
| 5,918,692 A | * | 7/1999 | Sekita et al. | 180/56 |
| 6,227,322 B1 | * | 5/2001 | Nishikawa | 180/68.5 |
| 6,598,691 B2 | * | 7/2003 | Mita et al. | 180/65.1 |
| 7,051,825 B2 | * | 5/2006 | Masui et al. | 180/68.5 |
| 7,637,340 B2 | * | 12/2009 | Kawase | 180/219 |
| 7,654,351 B2 | * | 2/2010 | Koike et al. | 180/68.5 |
| 2007/0215399 A1 | * | 9/2007 | Watanabe et al. | 180/68.5 |
| 2007/0269713 A1 | * | 11/2007 | Hanson et al. | 429/99 |
| 2008/0196957 A1 | * | 8/2008 | Koike et al. | 180/68.5 |

FOREIGN PATENT DOCUMENTS

| | | |
|---|---|---|
| EP | 1479567 A1 | 11/2004 |
| JP | 5-193369 A | 8/1993 |
| JP | 6-245394 A | 9/1994 |
| JP | 7-323735 A | 12/1995 |
| JP | 2000-318462 A | 11/2000 |
| JP | 2003-182378 A | 7/2003 |
| JP | 2004-345447 A | 12/2004 |
| WO | WO-2005/084985 A1 | 9/2005 |

* cited by examiner

*Primary Examiner* — J. Allen Shriver, II
*Assistant Examiner* — John R Olszewski
(74) *Attorney, Agent, or Firm* — Birch, Stewart, Kolasch & Birch, LLP

(57) ABSTRACT

A structure for mounting a battery onto an electric vehicle comprises: a body member forming a body of the electric vehicle; a battery case containing a battery; a supporting member, which is connected to the body member, fixed to a bottom of the battery case; and a clash-proof block connecting between the battery case and the body member.

15 Claims, 23 Drawing Sheets

US 7,926,602 B2

STRUCTURE FOR MOUNTING BATTERIES ONTO ELECTRIC VEHICLES

BACKGROUND OF THE INVENTION (1) Field of the Invention

The present invention relates to a structure for mounting a battery onto an electric vehicle.

(2) Description of Related Art

Structures for mounting batteries onto electric vehicles have been known in the art. The following related document 1 discloses an example of such a structure.

In the related document 1, as shown in FIGS. 1-4, a battery box (30) is fixed to side frames (20a and 20b) by front fixing portions (56a) and rear fixing portions (56b).

[Related Document 1] Japanese Laid-Open Publication H05-193369

However, by the technique of the related document 1, it is difficult to keep the battery box (30) in the correct position if a electric vehicle (10) is crashed.

For example, if a front end of the electric vehicle (10) is subject to impact, the battery box (30) moves forward due to inertia. Particularly, as the battery box (30) contains heavy batteries, the kinetic energy of the battery box (30) is considerable.

It is very difficult to keep the battery box (30) in the correct position by such a technique disclosed in the related document 1 whereby the front fixing portions (56a) and rear fixing portions (56b) fix the battery box (30) to the side frames (20a and 20b). Further, if the battery box (30) is fixed to the side frames (20a and 20b) by the structure shown in the related document 1, it is necessary to increase the size of the front and rear fixing portions (56a and 56b), and consequently, the weight and costs increase.

SUMMARY OF THE INVENTION

The present invention has been developed in consideration of this situation, and it is therefore an object of the invention to provide a structure for mounting a battery onto an electric vehicle to improve the crash-resistant capability of the battery mounted on the electric vehicle while preventing increased weight and cost.

For this purpose, in accordance with an aspect of the present invention, there is provided a structure for mounting the battery onto the electric vehicle comprising: a body member forming a body of the electric vehicle; a battery case containing a battery; a supporting member which is connected to the body member, fixed to a bottom of the battery case; and a clash-proof block connecting between the battery case and the body member.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 6 (B) is a side view schematically showing the same built-in nut in the embodiment of the present invention;

FIG. 6 (C) is a bottom view schematically showing the same built-in nut in the embodiment of the present invention;

DETAILED DESCRIPTION OF THE INVENTION

An embodiment of the present invention will now be described with reference to the accompanying drawings.

Figure 1:
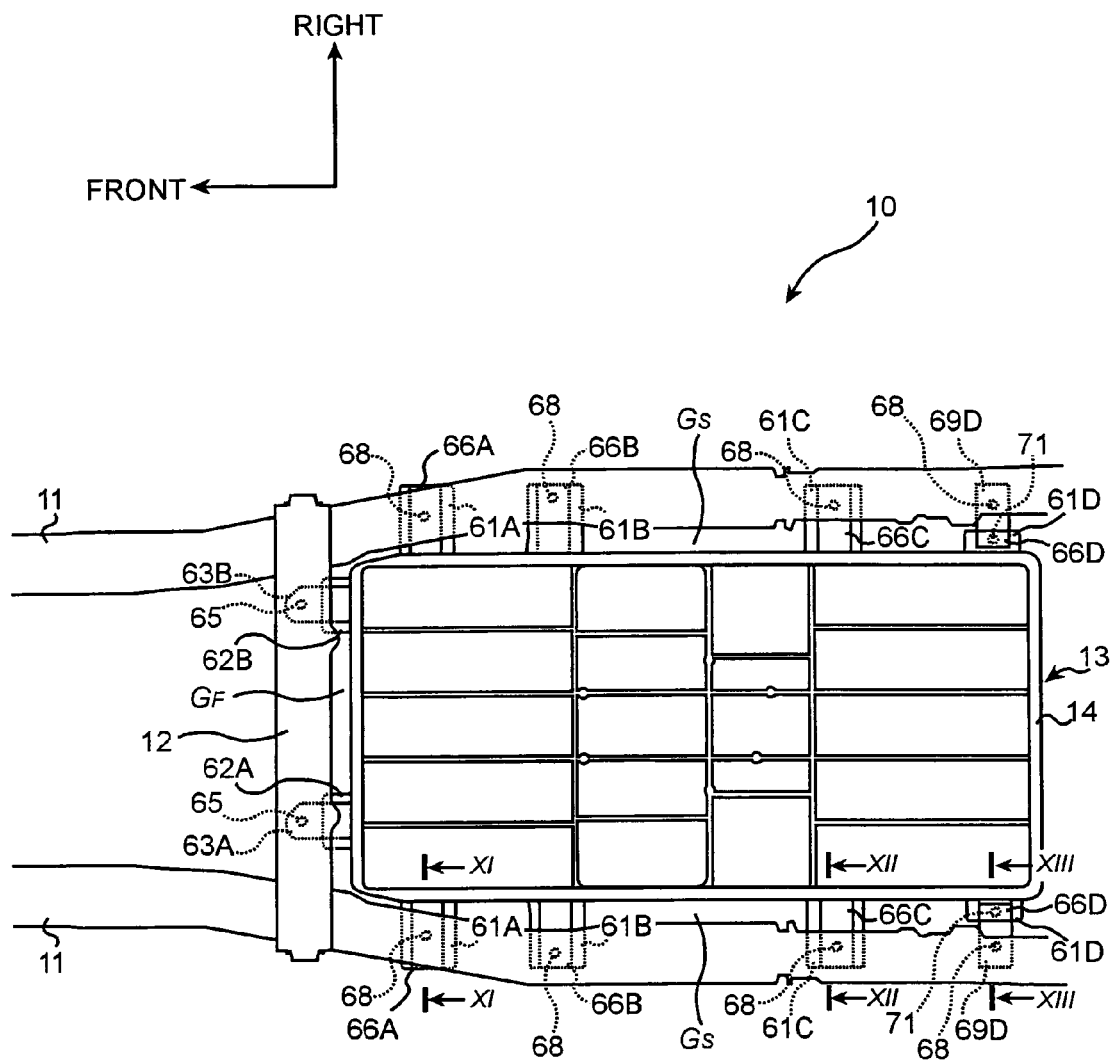
FIG. 1 is a top view schematically showing the entire configuration of an embodiment of the present invention.

As shown in FIG. 1, side members (also called 'body members' or 'first body members') 11 and 11 are mounted on the left and right sides of an electric vehicle 10. The side members 11 and 11 extend in the longitudinal direction of the electric vehicle 10.

Further, a battery cross member (also called 'body member' or 'second body member') 12, which extends in the transversal direction (left-right direction) and which connects the pair of side members 11 and 11, is also mounted in the electric vehicle 10.

The side members 11 and 11 and the battery cross member 12 are made of iron, and constitute a body of the electric vehicle 10.

At a position between the pair of side members 11 and 11 and rear of the battery cross member 12, a battery case 13 is disposed. The battery case 13, which is made from polybutylene resin including glass fibers, contains and holds batteries 20 (shown in FIG. 4) inside thereof while avoiding ventilation between outside and inside by keeping the inside of battery case 13 airtight.

Figure 2:
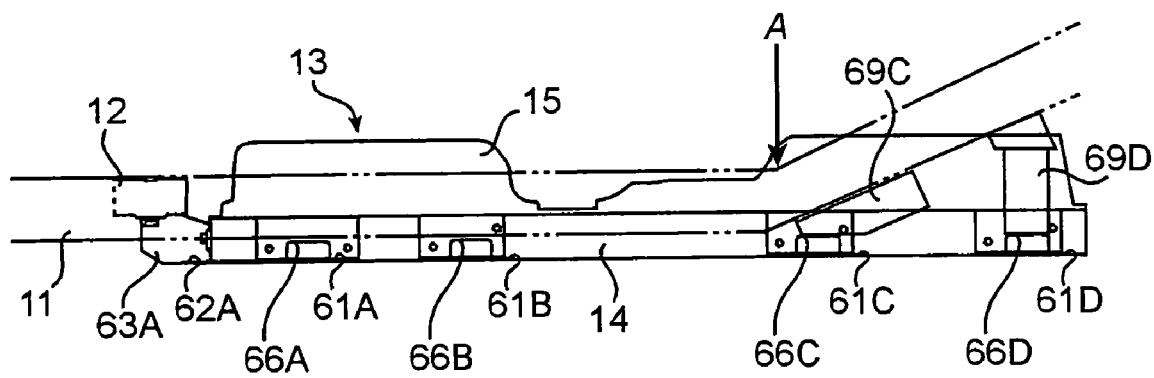
FIG. 2 is a side view schematically showing the entire configuration of the embodiment of the present invention.

As shown in FIG. 2, the battery case 13 mainly comprises a battery tray 14 and a battery cover 15.

Figure 3:
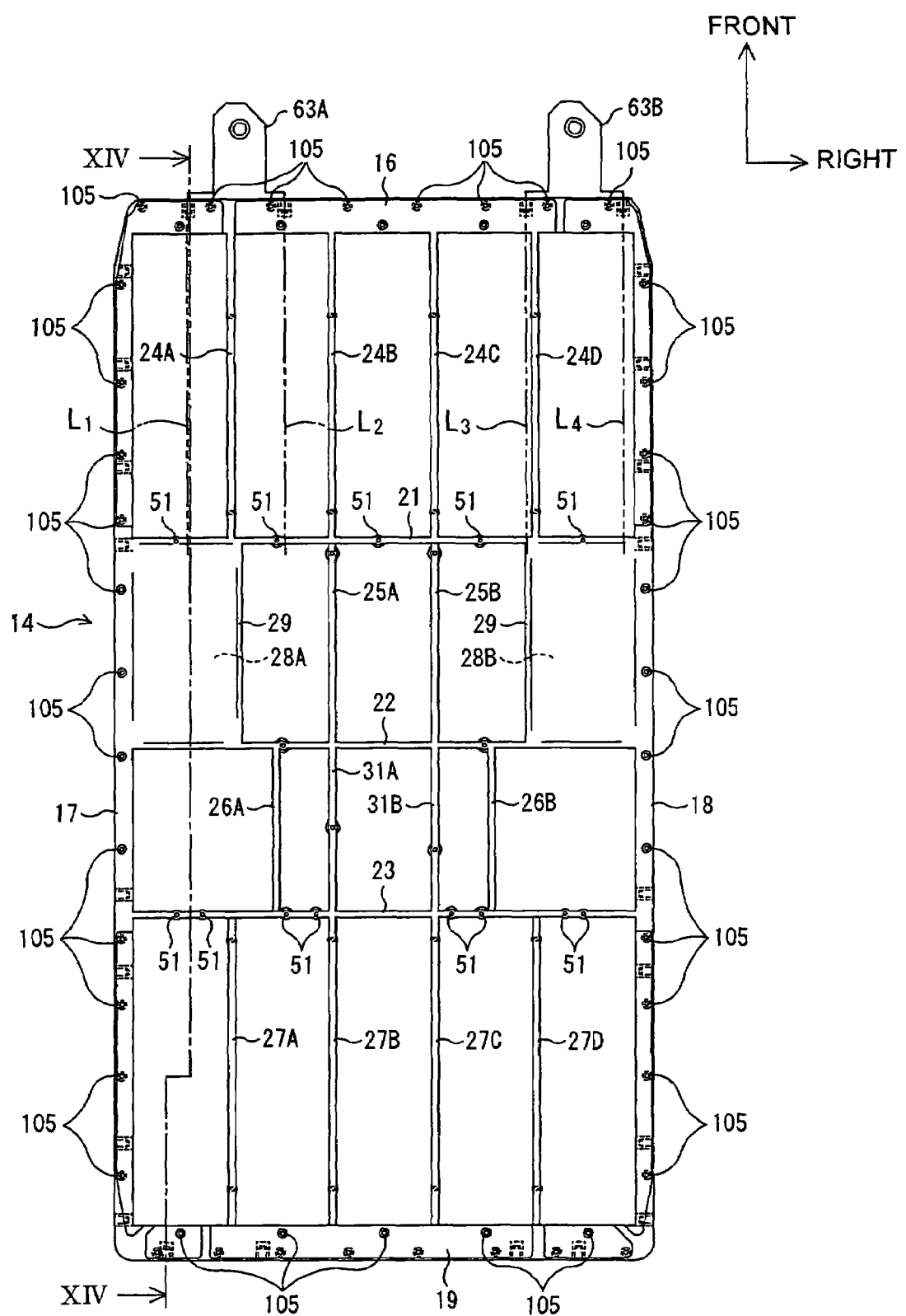
FIG. 3 is a top view schematically showing a battery tray in the embodiment of the present invention.

As shown in FIG. 3, a front-end wall 16, a left-end wall 17, a right-end wall 18, a rear-end wall 19, a front partition 21, a middle partition 22 and a rear partition 23 are fixed in the battery tray 14.

The front partition 21, the middle partition 22 and the rear partition 23 are walls extending between the left-end wall 17 and the right-end wall 18 in the left-right direction of the battery tray 14.

The front partition 21 is disposed at the front of the middle partition 22. The rear partition 23 is disposed at the rear of the middle partition 22.

Further, in the battery tray 14, front-battery partitions 24A, 24B, 24C and 24D are fixed. The front-battery partitions 24A, 24B, 24C and 24D are walls extending between the front-end wall 16 and the front partition 21 in the longitudinal direction (front-rear direction).

Furthermore, in the battery tray 14, rear-battery partitions 27A, 27B, 27C and 27D are fixed. The rear-battery partitions 27A, 27B, 27C and 27D are walls extending between the rear-end wall 19 and the rear partition 23 in the front-rear direction.

Still further, in the battery tray 14, front reinforcing walls 25A and 25B and concave side walls 29 and 29 are formed. The front reinforcing walls 25A and 25B are walls extending between the front partition 21 and the middle partition 22 in the front-rear direction. The concave side walls 29 and 29 are walls to individually make concave portions 28A and 28B.

Between the rear partition 23 and the middle partition 22, middle-battery partitions 26A and 26B are formed which walls extend in the front-rear direction.

Further, between the middle-battery partitions 26A and 26B, rear reinforcing walls 31A and 31B are formed which walls extend in the front-rear direction.

Figure 4:
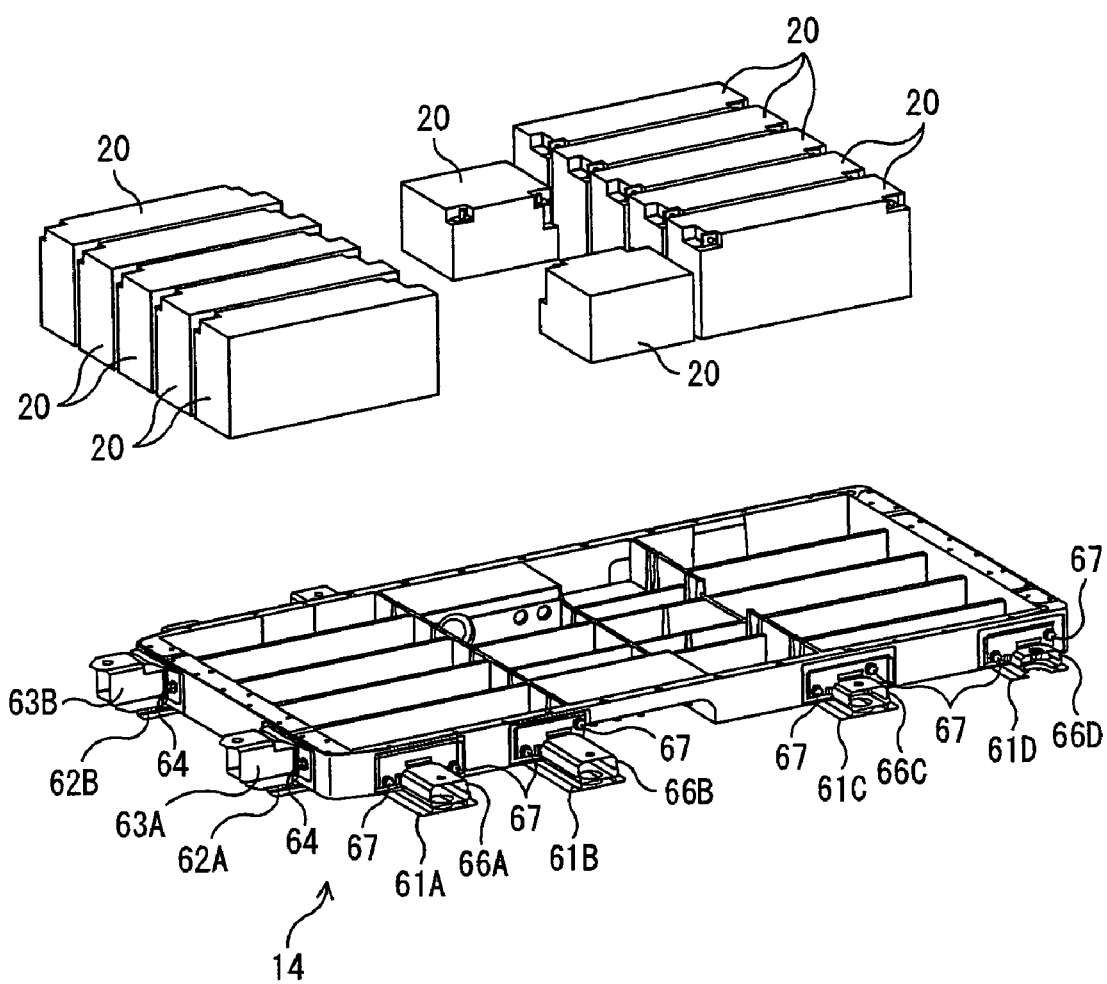
FIG. 4 is a schematic perspective view mainly showing batteries in a battery case and a battery fastener in the embodiment of the present invention.

As shown in FIG. 4, batteries 20 are fixed securely inside the battery case 13 in such a way that after the batteries 20 are individually disposed at the correct positions on the battery tray 14, the batteries 20 are supported by battery holders (not shown), then the battery holders are fixed to the battery tray 14 by bolts (not shown).

Figure 5:
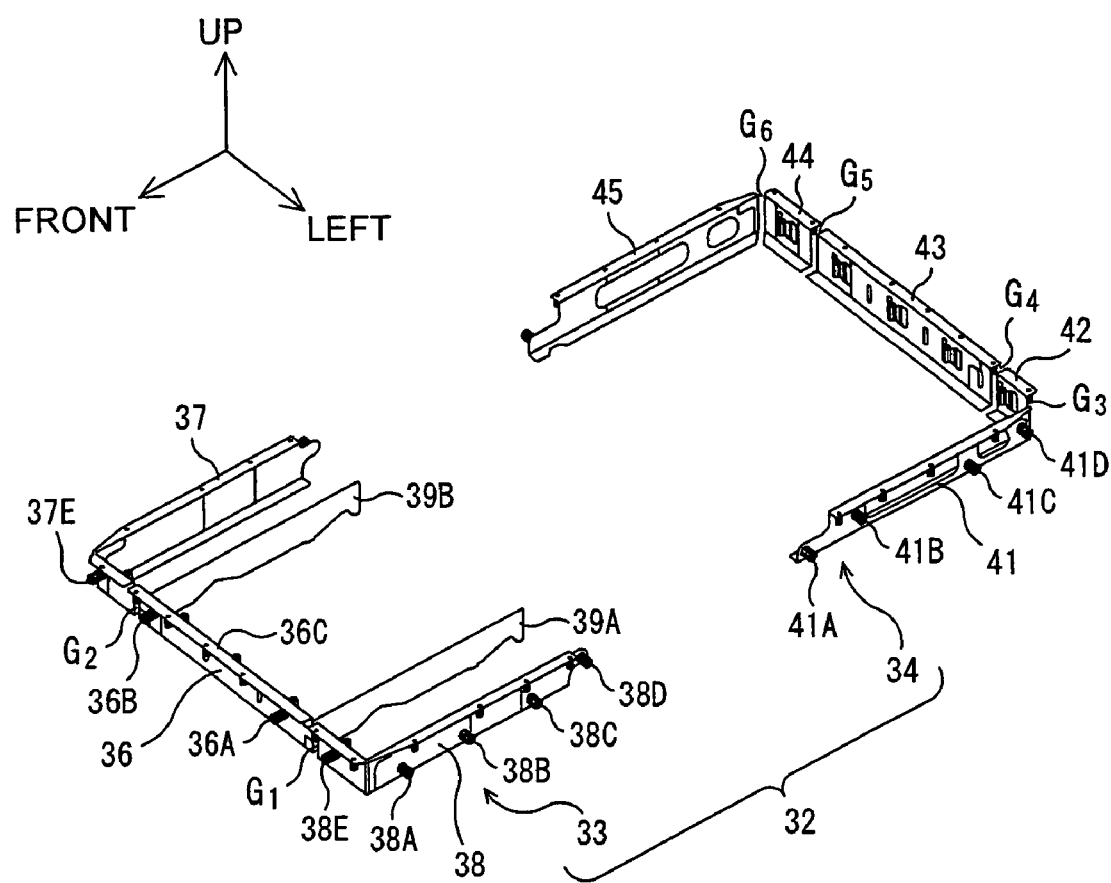
FIG. 5 is a schematic perspective view mainly showing metal frames built into a battery tray in the embodiment of the present invention.

As shown in FIG. 5, in the battery tray 14, a frame set (also called 'metal frame') 32 is included. The frame set 32, which is made from iron, mainly comprises front frame set 33 and rear frame set 34.

The front frame set 33 comprises a front-left frame 38, a front-middle frame 36 and a front-right frame 37.

The front-left frame 38 is an L-shaped part. On a left surface of the front-left frame 38, nuts 38A, 38B, 38C and 38D are welded. Further, on a front surface of the front-left frame 38, a nut 38E is welded. The front-left frame 38 is embedded in the left-end wall 17 and the front-end wall 16 of the battery tray 14 shown in FIG. 3.

Likewise, the front-right frame 37 shown in FIG. 5 is an L-shaped part. On a right surface of the front-right frame 37, nuts (not shown) are welded. Further, on a front surface of the front-right frame 37, a nut 37E is welded. The front-right frame 37 is embedded in the right-end wall 18 and the front-end wall 16 of the battery tray 14 as shown in FIG. 3.

The front-middle frame 36 shown in FIG. 5 is a U-shaped part. On the front surface of the front-middle frame 36, two nuts 36A and 36B are welded.

Additional plates 39A and 39B, which are parts of the front-middle frame 36, extend in the front-rear direction. The additional plate 39A is embedded in the front-battery partition 24A, which is disposed between imaginary lines $L_1$ and $L_2$ and extends rearward from a front block (also called 'first clash-proof block') 63A shown in FIG. 3. Likewise, the other additional plate 39B is embedded in the front-battery partition 24D, which is disposed between imaginary lines $L_3$ and $L_4$ extending rearward from another front block (also called 'first clash-proof block') 63B. A front wall 36C, which is a part of the front-middle frame 36, extends in the left-right direction. The front wall 36C is embedded in the front-end wall 16. Into the nuts 38A, 38B, 38C, 38D, 38E and 37E, bolts 67 are fitted.

The rear frame set 34 shown in FIG. 5 comprises a rear-lateral-left frame 41, a rear-end-left frame 42, a rear-end-middle frame 43, a rear-end-right frame 44 and a rear-lateral-right frame 45.

The rear-lateral-left frame 41 is a part embedded in the left-end wall 17 shown in FIG. 3. On a left surface of the rear-lateral-left frame 41, nuts 41A, 41B, 41C and 41D are welded.

Likewise, the rear-lateral-right frame 45 shown in FIG. 5 is embedded in the right-end wall 18 shown in FIG. 3. On a right surface of the rear-lateral-right frame 45 four nuts (not shown) are welded.

As shown in FIG. 5, the rear-end-left frame 42, the rear-end-middle frame 43 and the rear-end-right frame 44 are embedded in the rear-end wall 19 shown in FIG. 3.

Between the front-left frame 38 and the front-middle frame 36, gap G1 is formed. Between the front-right frame 37 and the front-middle frame 36, gap G2 is formed. Further, between the rear-lateral-left frame 41 and the rear-end-left frame 42, gap G3 is formed. Still further, between the rear-end-left frame 42 and the rear-end-middle frame 43, gap G4 is formed. Furthermore, between the rear-end-middle frame 43 and the rear-end-right frame 44, gap G5 is formed. Still furthermore, between the rear-end-right frame 44 and the rear-lateral-right frame 45, gap G6 is formed.

Figure 6:
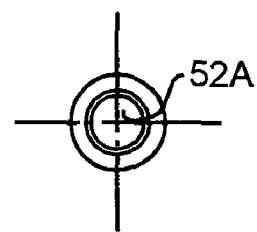
FIG. 6 (A) is a top view schematically showing a built-in nut in the embodiment of the present invention.
Figure 6:
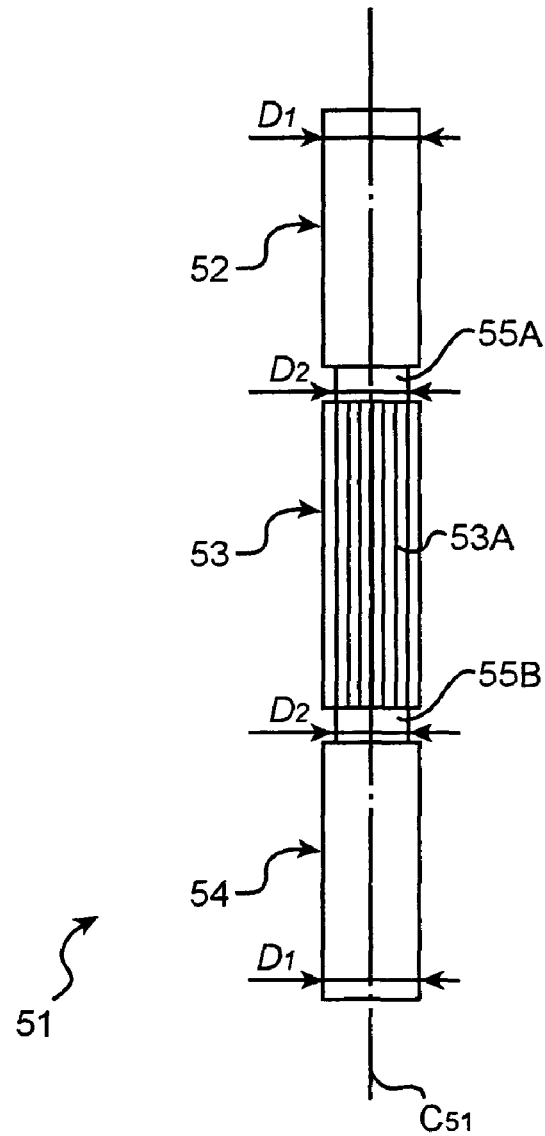
Figure 6:
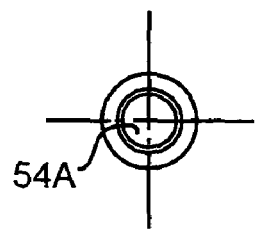
Figure 7:
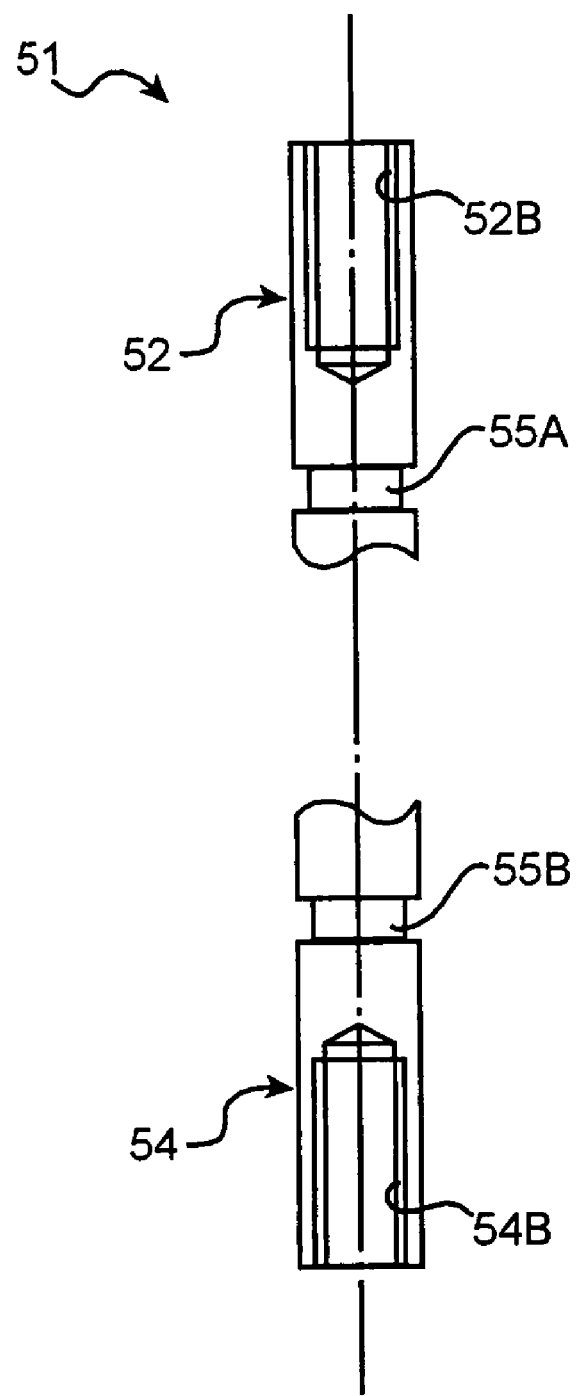
FIG. 7 is a cross-section view schematically showing the same built-in nut in the embodiment of the present invention.

A built-in nut 51 shown in FIGS. 6 (A), (B), (C) and FIG. 7 is embedded in the battery tray 14.

The iron built-in nut 51 comprises an upper nut 52, a middle stem 53 and a lower nut 54.

The upper nut 52 is a cylindrical part which extends in the vertical direction and has an upper opening 52A which opens upwardly. Inside the upper nut 52, a bolt groove 52B is formed.

The lower nut 54 is identical to the upper nut 52 except that the upper nut 52 is in an upside-down position. In other words, the lower nut 54 is also a cylindrical part which extends in the vertical direction and has a lower opening 54A which opens downwardly. Inside the lower nut 54, a bolt groove 54B is formed.

The middle stem 53 is a cylindrical part between the upper nut 52 and the lower nut 54. On the surface of the middle stem 53, a plurality of notches (serrated portion) 53A are formed.

Between the upper nut 52 and the middle stem 53, an upper constriction 55A is formed. Also, between the middle stem 53 and the lower nut 54, a lower constriction 55B is formed.

The upper constriction 55A and the lower constriction 55B are cylindrical parts whose outer diameter (second diameter) $D_2$ is smaller than the outer diameter (first diameter) $D_1$ of the upper nut 52, the lower nut 54 and the middle stem 53.

Because of the serrated portion 53A formed on the middle stem 53, it is possible to avoid loosening and spinning of the built-in nut 51 embedded in the battery tray 14 even if a rotational torque is inputted to the built-in nut 51 around the center axis $C_{51}$.

Further, according to the upper constriction 55A and the lower constriction 55B, it is possible to avoid the built-in nut 51 dropping from the battery tray 14 even if the force is inputted to the built-in nut 51 along the direction of the center axis $C_{51}$.

Figure 8:
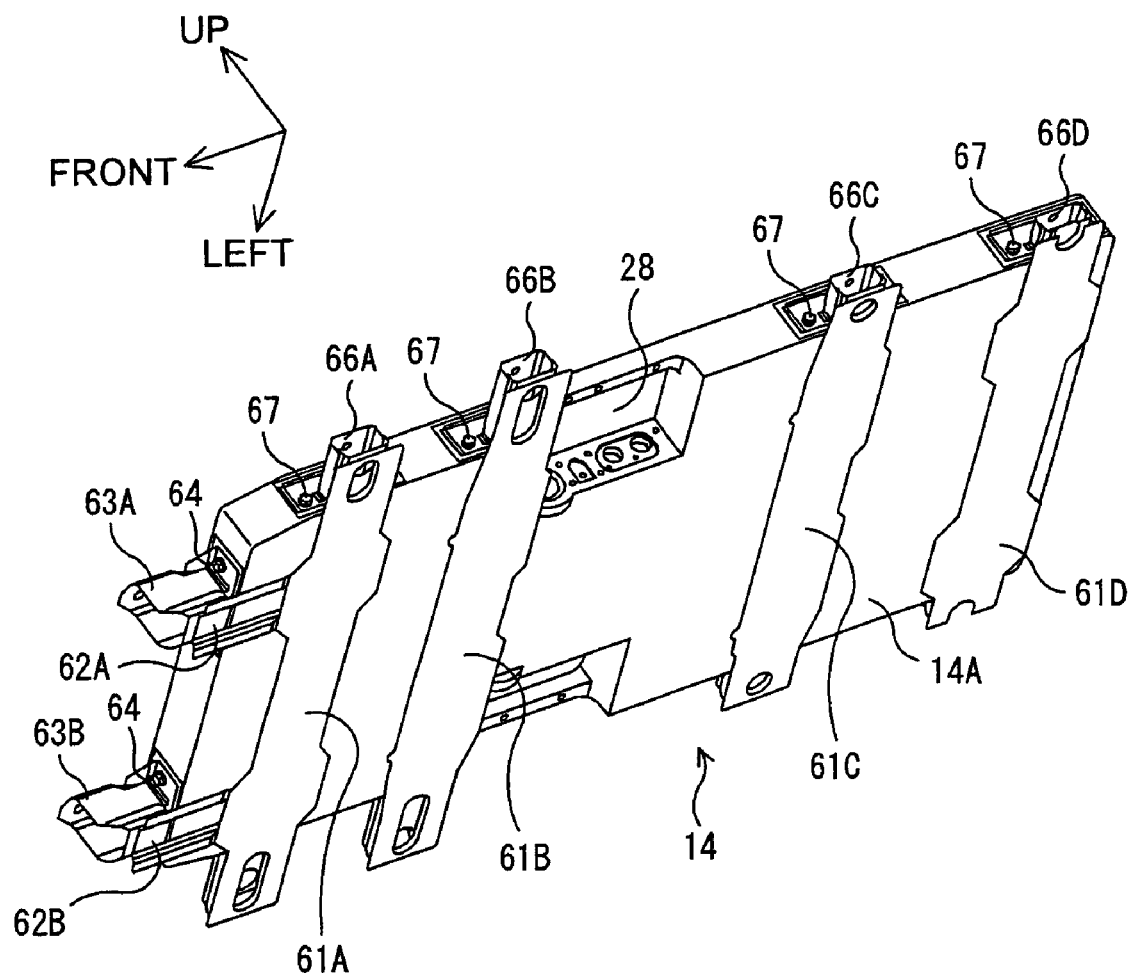
FIG. 8 is a perspective bottom view schematically showing the bottom side of the battery case in the embodiment of the present invention.
Figure 9:
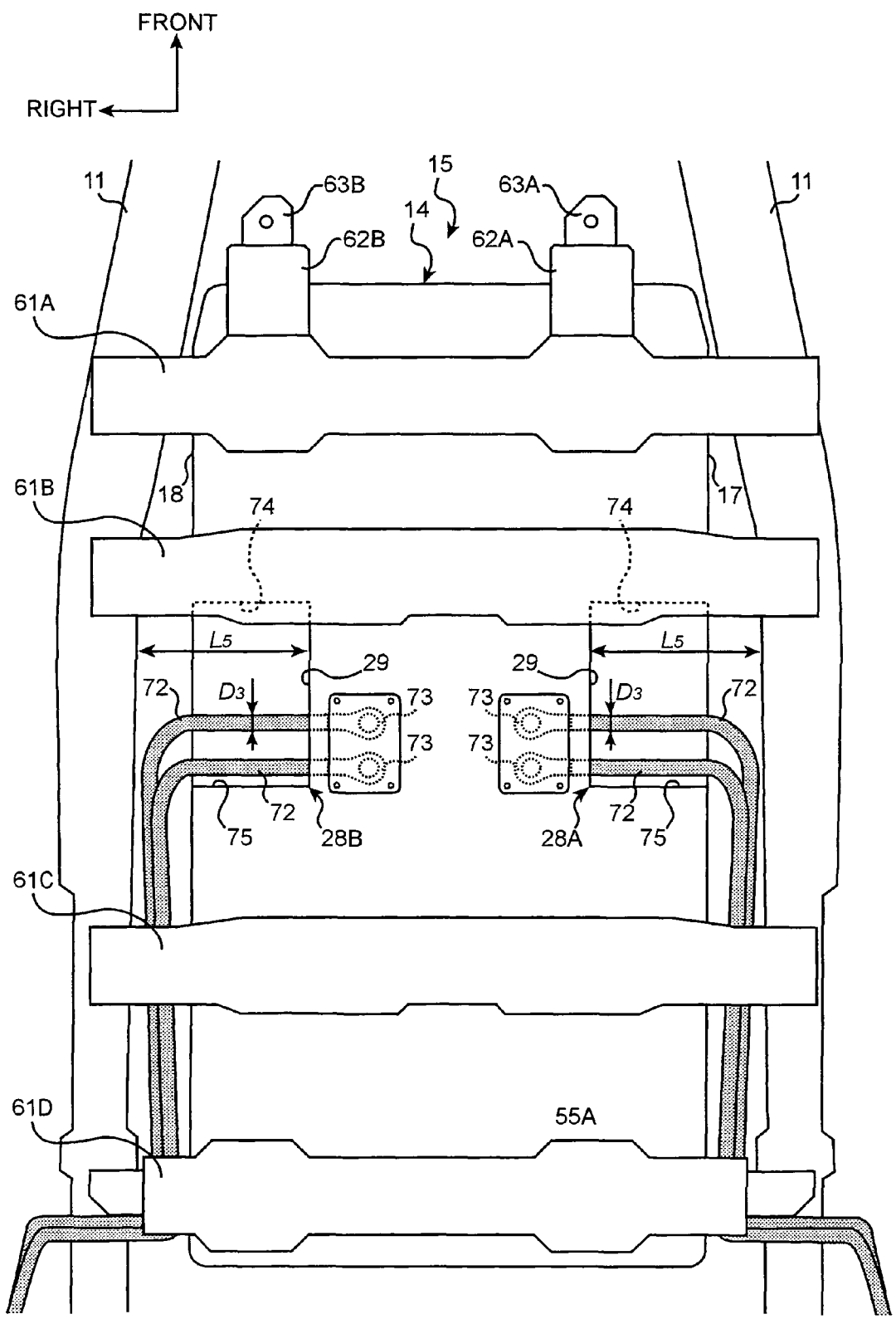
FIG. 9 is a perspective view schematically showing the bottom side of the battery case in the embodiment of the present invention.

As shown in FIG. 8 and FIG. 9, lateral-end supporting members (also called 'supporting members' or 'first supporting members') 61A, 61B, 61C and 61D are fixed to the bottom surface 14A of the battery tray 14.

The lateral-end supporting member 61A is disposed at the front row called an A-supporting member 61A. The lateral-end supporting member 61B disposed rear of the A-supporting member 61A is called a B-supporting member 61B.

Further, the lateral-end supporting member 61C disposed rear of the B-supporting member 61B is called a C-supporting member 61C. Likewise, the lateral-end supporting member 61D disposed rear of the C-supporting member 61C is called a D-supporting member 61D.

As shown in FIG. 1, each of the lateral-end supporting members 61A, 61B, 61C and 61D extends in the transversal direction connecting between the side members 11 and 11 to support the bottom surface 14A. The lateral-end supporting members 61A, 61B, 61C and 61D are made from iron.

As shown in FIG. 8, on the A-supporting member 61A, front-end supporting members (also called 'supporting members' and 'second supporting members') 62A and 62B are fixed. Each of the front-end supporting members 61A and 62B is a part which extends in the longitudinal direction of the vehicle 10 and is projected forward from the front end of battery tray 14.

Figure 10:
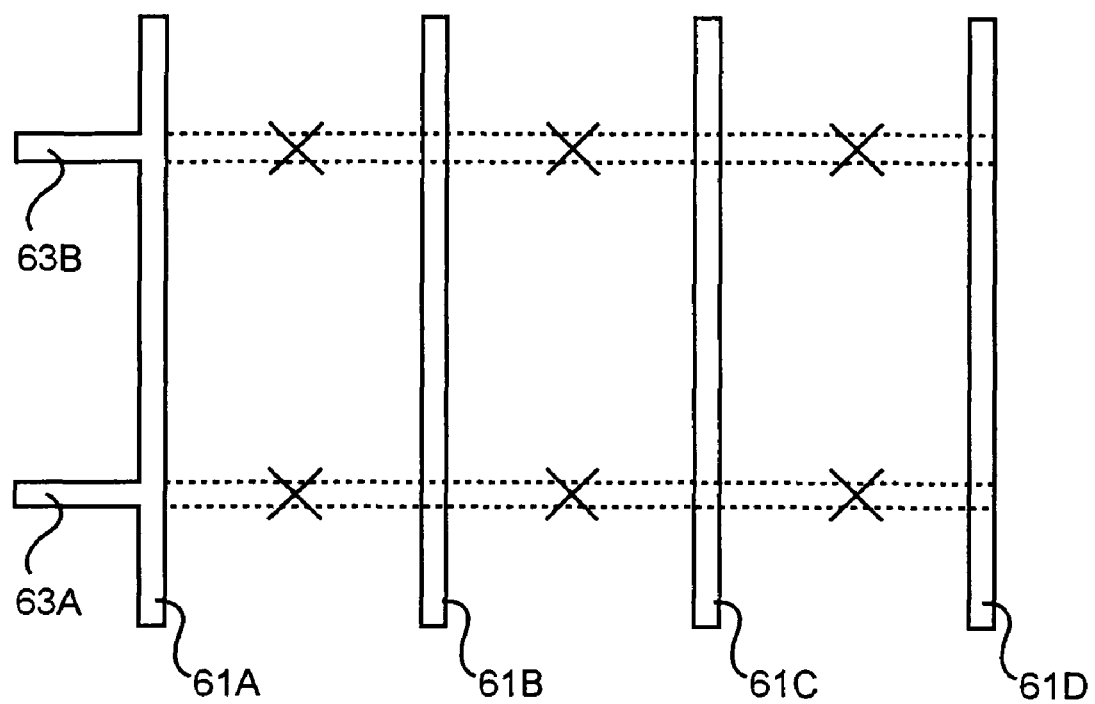
FIG. 10 is a schematic view showing lateral-end supporting members and a front-end supporting member in the embodiment of the present invention.

As shown in FIG. 10, the front-end supporting members 62A and 62B are only connected to the A-supporting member 61A and are not connected to the B-supporting member 61B, C-supporting member 61C and D-supporting member 61D (see 'X' in FIG. 10).

As shown in FIG. 1, the front-end supporting members 62A and 62B connect between the battery cross member 12 and A-supporting member 61A via front blocks 63A and 63B which will be described just below. In addition, the front-end supporting members 62A and 62B are made from iron.

On the front-end supporting members 62A and 62B, each of the front blocks (also called 'clash-proof blocks' or 'first clash-proof blocks') 63A and 63B is welded respectively. The front blocks 63A and 63B are fixed to the front-end wall 16 by bolts 64 (shown in FIG. 8) and are fixed to the battery cross member 12 by bolts 65 (shown in FIG. 1).

In other words, the front blocks 63A and 63B are parts which individually connect between the battery cross member 12 and the A-supporting member 61A and are disposed between the battery cross member 12 and the battery tray 14. Further, the front blocks 63A and 63B are made from iron.

As shown in FIG. 1, second clash-proof blocks (also called "clash-proof blocks' or 'second clash-proof blocks') 66A, 66B, 66C and 66D are respectively welded on both ends of each of the lateral-end supporting members 61A, 61B, 61C and 61D.

The lateral clash-proof block 66A fixed on the A-supporting member 61A is called an A-lateral clash-proof block 66A. The lateral clash-proof block 66B fixed on the B-supporting member 61B is called a B-lateral clash-proof block 66B. The lateral clash-proof block 66C fixed on the C-supporting member 61C is called a C-lateral clash-proof block 66C. The lateral clash-proof block 66D fixed on the D-supporting member 61D is called a D-lateral clash-proof block 66D.

As shown in FIG. 8, the lateral clash-proof blocks 66A, 66B, 66C and 66D are fixed to the left-end wall 17 and the right-end wall 18 of the battery tray 14 by bolts 67, and are fixed to the side members 11 and 11 by bolts 68 as shown in FIG. 1.

As shown in FIG. 2, the lateral clash-proof blocks 66A, 66B, 66C and 66D, which connect between side member 11 and the battery case 13, are respectively disposed between the bottom surface of the side member 11 and the lateral-end supporting members 61A, 61B, 61C and 61D. Each of the lateral clash-proof blocks 66A, 66B, 66C and 66D is made from iron and is a hollow square pillar in shape.

Further, each of the A-lateral clash-proof block 66A and the B-lateral clash-proof block 66B is directly fixed to the side member 11, whereas, as shown in FIG. 2, the C-lateral clash-proof block 66C is fixed to the side member 11 via a C-connecting block 69C. Also, the D-lateral clash-proof block 66D is fixed to the side member 11 via a D-connecting block 69D.

Although the side member 11 is extended from a point (shown as an arrow A in FIG. 2) backwardly and upwardly, the battery tray 14 is kept in a horizontal position because the C-connecting block 69C is interposed between the side member 11 and the C-supporting member 61C, also the D-connecting block 69D is interposed between side member 11 and the D-supporting member 61D.

Figure 11:
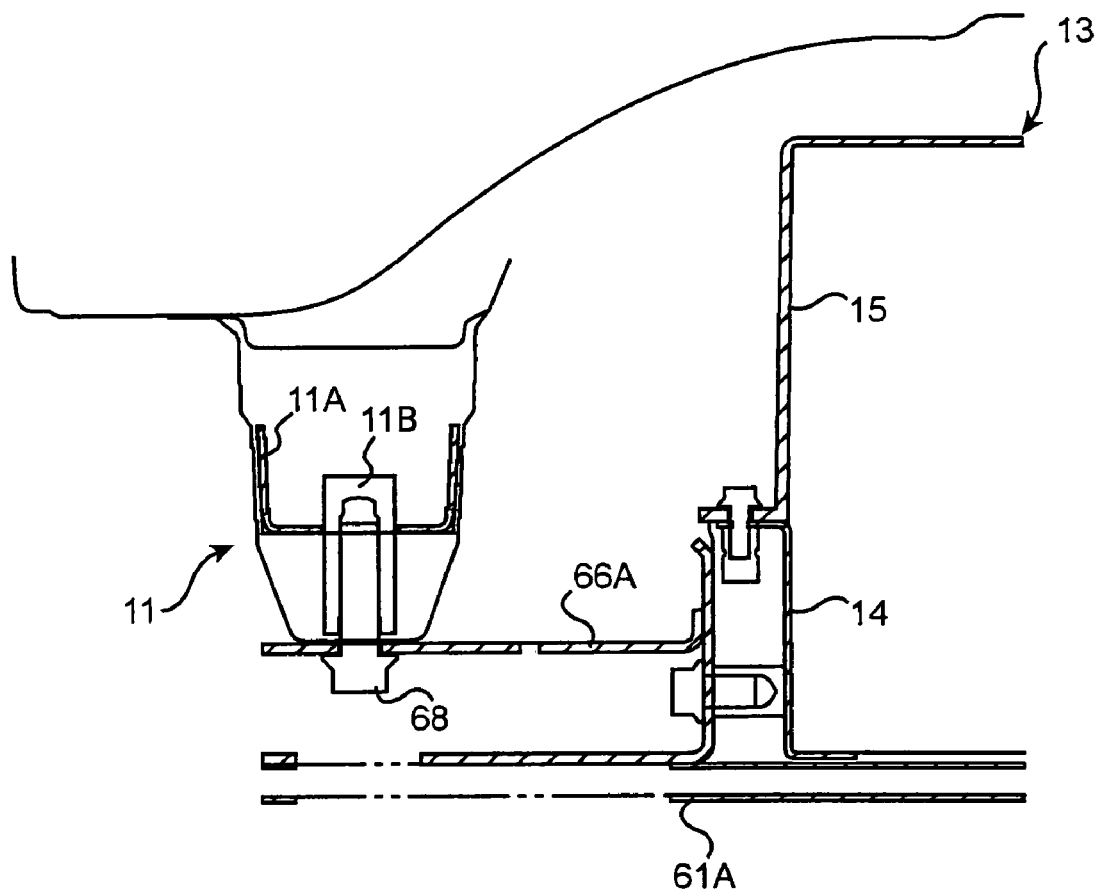
FIG. 11 is a cross-section view indicated XI-XI in FIG. 1 schematically showing a part of the structure in the embodiment of the present invention.

As shown in FIG. 11, the A-supporting member 61A is fixed by the bolt 68 engaged with a cap nut 11B mounted in the reinforcing member 11A of the side member 11. The B-supporting member 61B is also fixed to the side member 11 by the structure shown in FIG. 11, description of which is omitted in the drawings.

Figure 12:
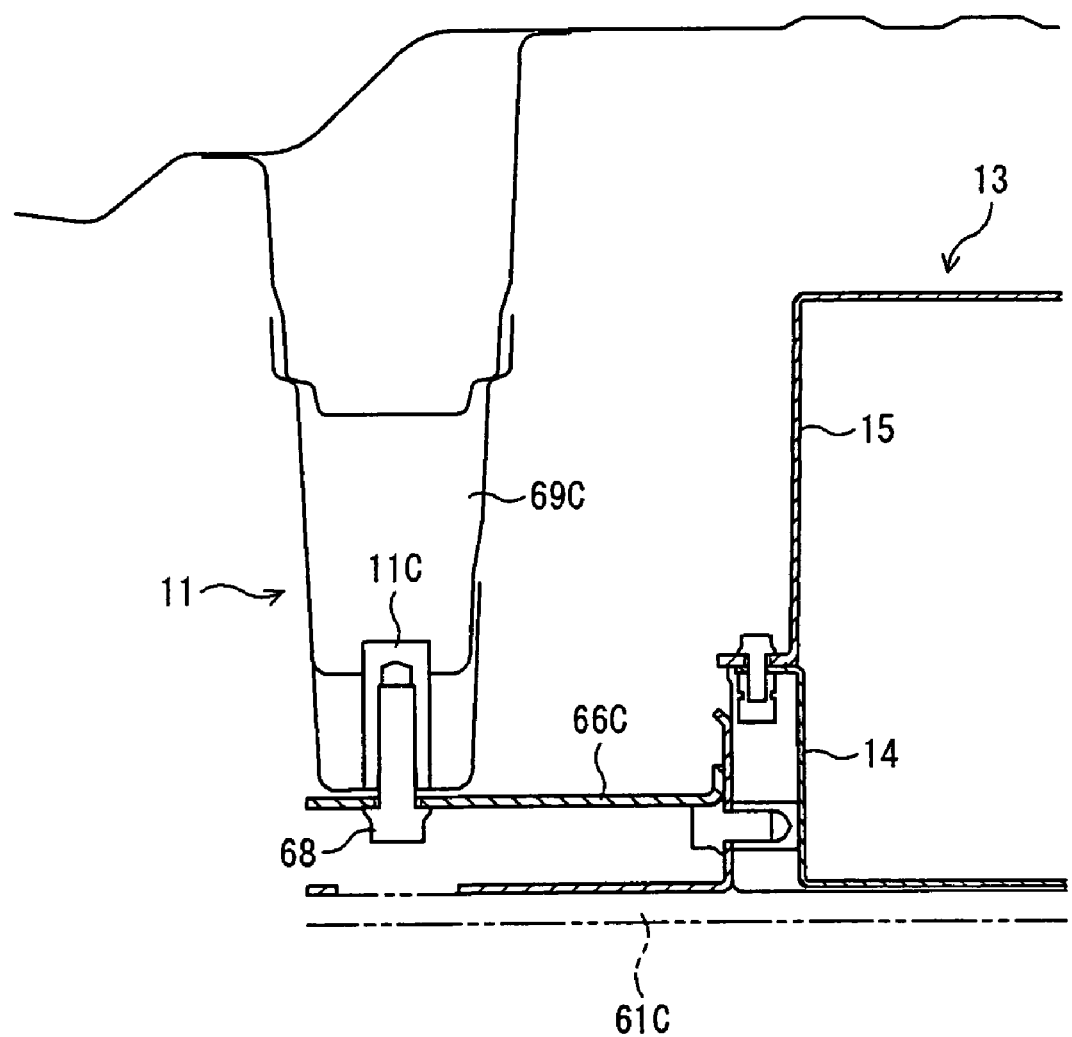
FIG. 12 is a cross-section view indicated XII-XII in FIG. 1 schematically showing a part of the structure in the embodiment of the present invention.

As shown in FIG. 12, the C-supporting member 61C is connected to the side member 11 via the C-connecting block 69C. The C-connecting block 69C is a hollow iron part in which a cap nut 11C is mounted. The C-supporting member 61C is fixed to the C-connecting block 69C by the bolt 68 engaged with the cap nut 11C

Figure 13:
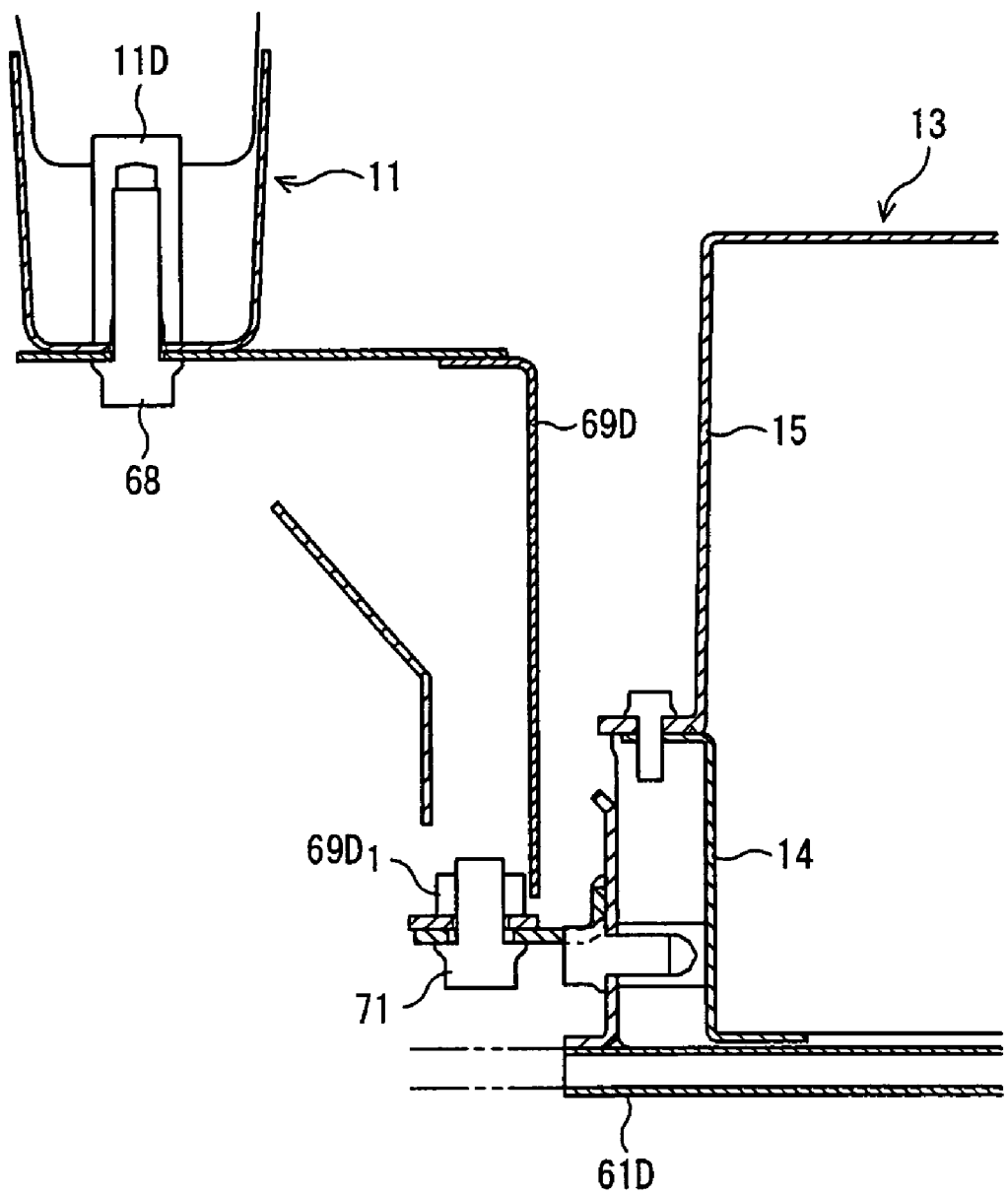
FIG. 13 is a cross-section view indicated XIII-XIII in FIG. 1 schematically showing a part of the structure in the embodiment of the present invention.

As shown in FIG. 13, the D-supporting member 61D is connected to the side member 11 via the D-connecting block 69D. The D-connecting block 69D is a hollow iron part. The D-supporting member 61D is fixed to the side member 11 by the bolt 68 engaged with the cap nut 11D mounted in the side member 11.

Further, a nut $69D_1$ is welded on the bottom of the D-connecting block 69D. The D-supporting member 61D is fixed to the D-connecting block 69D by a bolt 71 which engages with the nut $69D_1$.

As shown in FIG. 9, between the left-end wall 17 of the battery tray 14 and the side member 11 and between the right-end wall 18 of the battery tray 14 and the side member 11, two high-voltage cables 72 are respectively disposed. The high-voltage cables 72, which are capable of carrying about 300V, connect between the batteries 20 mounted in the battery case 13 and an inverter (also called 'external device) not shown in the drawings.

Each of the high-voltage cables 72 has a hole connector 73 connected to an electric-output socket (not shown) in the battery case 13.

At both the lateral surface of the battery tray 14 facing the side members 11 (namely, at the left-end wall 17 and the right-end wall 18) and the bottom surface 14A of the battery tray 14, dent portions 28A and 28B are formed.

Each of the dent portions 28A and 28B has a concave side wall 29, which extends parallel to the side member 11, a concave front wall 74, which extends from the front end of the concave side wall 29 in the lateral direction, and a concave rear wall 75, which extends from the rear end of the concave side wall 29 in the lateral direction.

Figure 14:
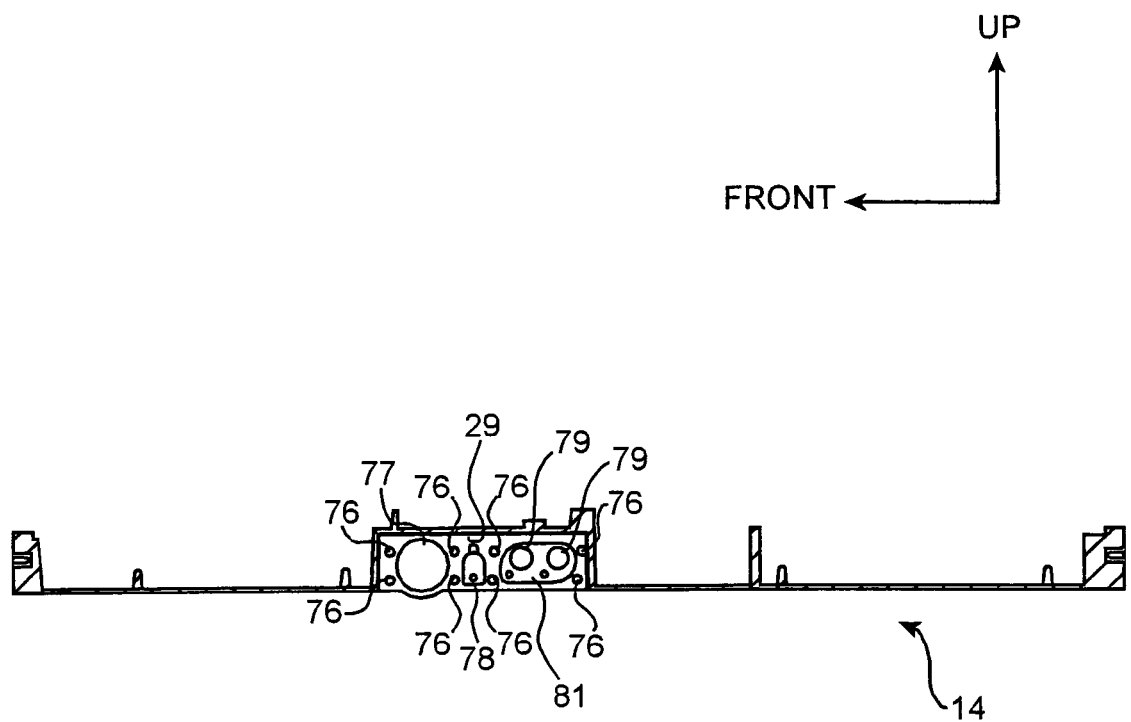
FIG. 14 is a cross-section view indicated XIV-XIV in FIG. 1 schematically showing a part of the structure in the embodiment of the present invention.

Further, as shown in FIG. 14, casing bolt-hole portions 76, a casing low-voltage cable hole portion 77, a casing center-hole portion 78 and a casing high-voltage cable hole portion (cable hole portion) 79 are formed at the concave side wall 29.

Figure 15:
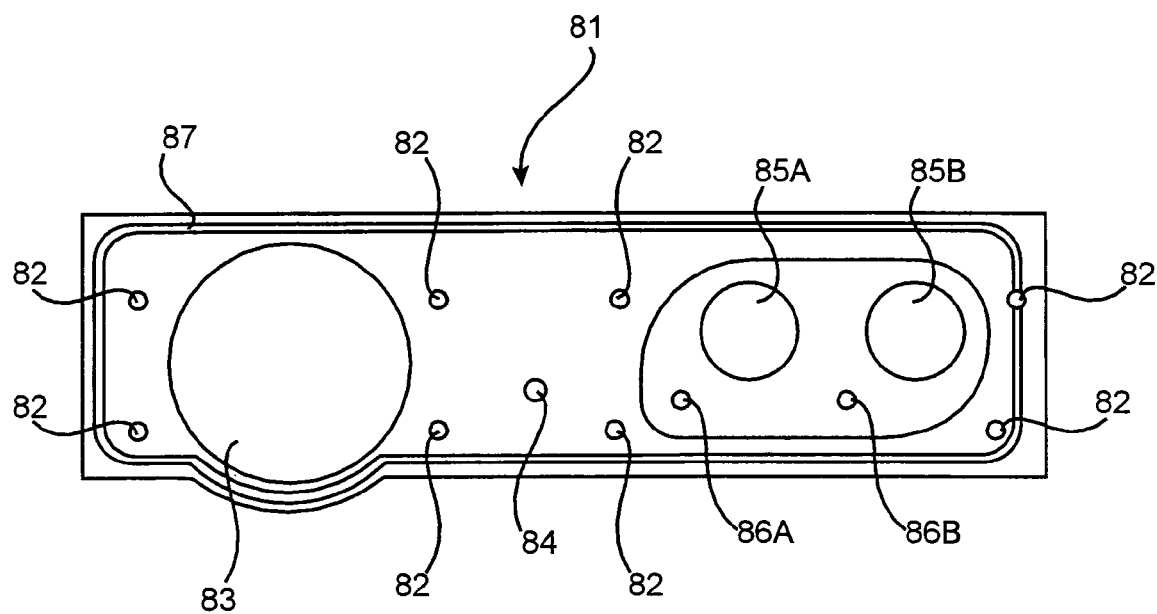
FIG. 15 is a front view schematically showing a cover plate in the embodiment of the present invention.

A cover plate 81 shown in FIG. 15 is fixed on the back surface of the concave side wall 29. Cover plate 81 will be described below in detail.

Each of the casing bolt-hole portions 76 shown in FIG. 14 is a hole through which a plate fixing bolt (not shown) is engaged with a plate bolt-hole portion 82 formed on the cover plate 81.

Low-voltage cables 89 (shown in FIG. 16) used for supplying about 12V electric power to electrical equipment pass through the casing low-voltage cable hole portion 77. Further, the casing low-voltage cable hole portion 77 communicates with a plate low-voltage cable hole portion 83.

The casing center hole portion 78 communicates with a venting hole 84 formed at the cover plate 81.

High-voltage cable 72 (shown in FIG. 9) passes through each of the casing high-voltage cable hole portions 79 and 79. The casing high-voltage cable hole portions 79 and 79 respectively communicate with plate high-voltage cable hole portions 85A and 85B formed at the cover plate 81.

Further, each concave side wall 29 is kept at a distance $L_5$ (shown in FIG. 9) defined based on the outer diameter $D_3$ of the high-voltage cable 72 from the side member 11.

The greater the outer diameter $D_3$ (thickness) of the high-voltage cable 72, the greater distance $L_5$ between the concave side wall 29 and the side member 11 becomes to permit bending of cable 72. Conversely, the smaller outer diameter $D_3$, the shorter distance $L_5$ may be.

As shown in FIG. 15, the cover plate 81 is fixed to the back surface of concave side wall 29 of the battery tray 14. The cover plate 81 is a plate made from aluminum covering the casing bolt-hole portions 76, the casing low-voltage cable hole portion 77, the casing center hole portion 78 and the casing high-voltage cable hole portions 79 as discussed with reference to FIG. 14.

Aluminum is used for cover plate 81 because both rigidity and weight saving are required, and it is also necessary to avoid detachment between the cover plate 81 and battery tray 14 even if the resin material of battery tray 14 expands or contracts due to temperature variation.

One point the inventors have focused attention on is that the linear expansion coefficients of the main material of the battery tray 14 which is polybutylene resin including glass fiber and the material of the cover plate 81 which is aluminum, are almost the same, and accordingly, the cover plate 81 is made from aluminum.

At the cover plate 81, the plate bolt-hole portions 82, the plate low-voltage cable hole portion 83, the venting hole 84 and the plate high-voltage hole portions (cable hole portions) 85A and 85B are formed.

Figure 17:
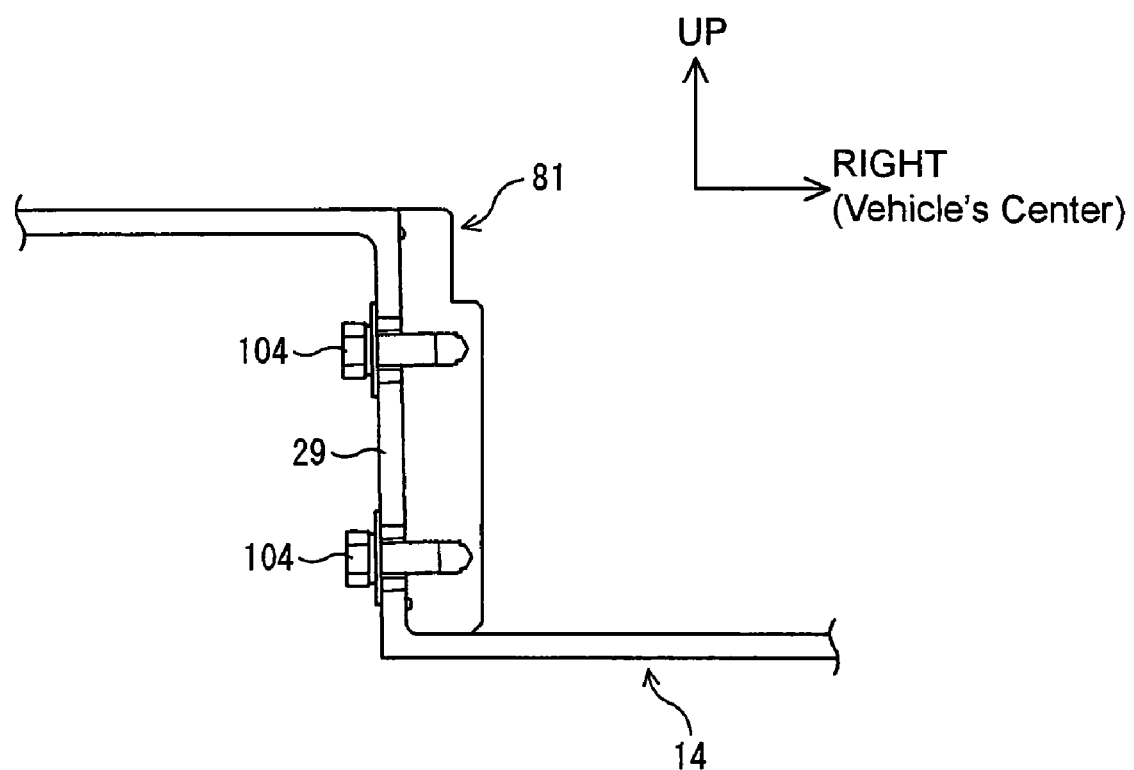
FIG. 17 is a cross-section view indicated XVII-XVII in FIG. 16 schematically showing a part of the structure in the embodiment of the present invention.

Each of the plate bolt-hole portions 82 is a hole in which each of the plate fixing bolts 104 shown in FIG. 17 are engaged.

The plate bolt-hole portions 82 open to the front side (near side in FIG. 15) of the cover plate 81. However, the plate bolt-hole portions 82 do not open to the back (far side in FIG. 15) of the cover plate 81. Consequently, the cover plate 81 is not penetrated by the plate bolt-hole portions 82.

Figure 16:
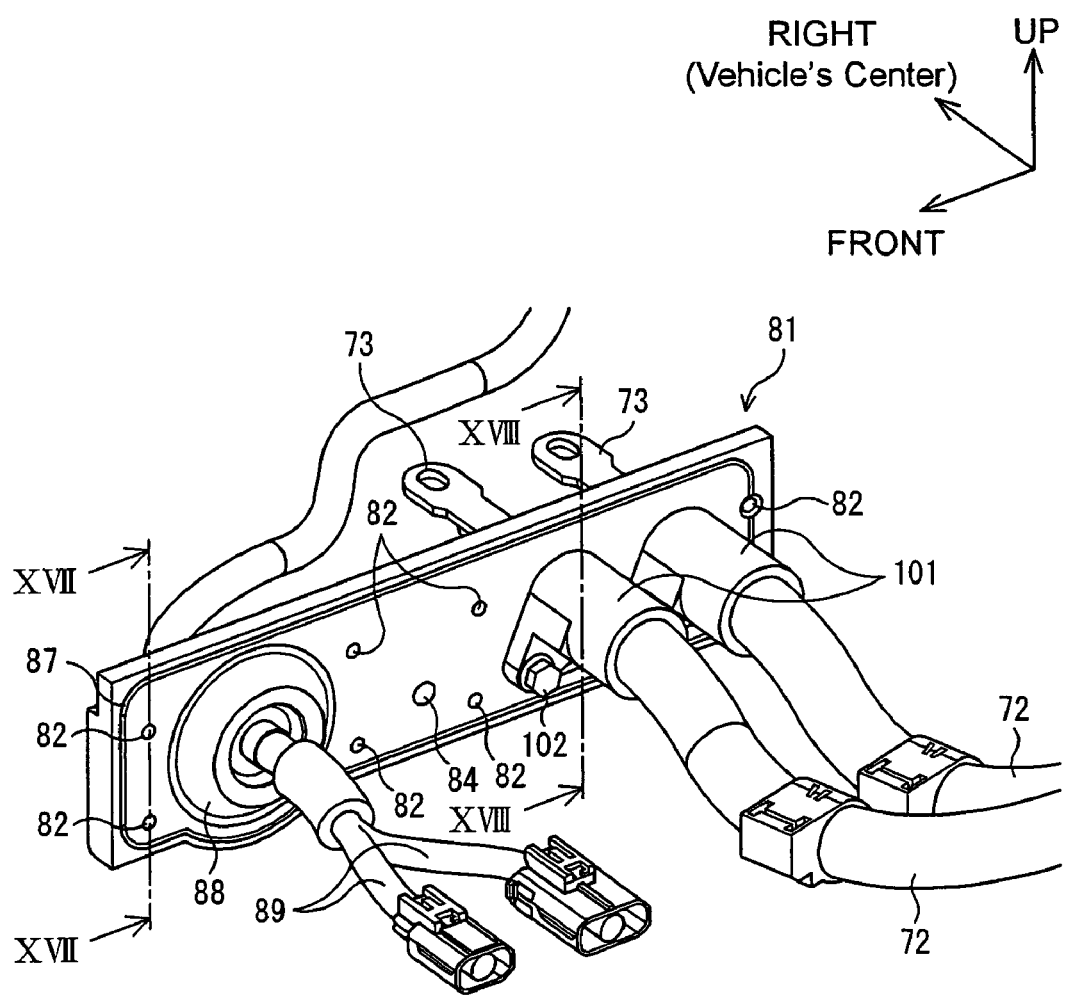
FIG. 16 is a perspective view schematically showing the cover plate in the embodiment of the present invention.

In the plate low-voltage cable hole portion 83, as shown in FIG. 16, a rubber cap 88 is fitted. The low-voltage cables 89 are inserted through the rubber cap 88.

The venting hole 84 is a hole for venting air from the battery case 13 when the air pressure increases in the battery case 13. In venting hole 84, a one-way valve (not shown) is fitted, thereby maintaining airtightness in the battery case 13.

Figure 18:
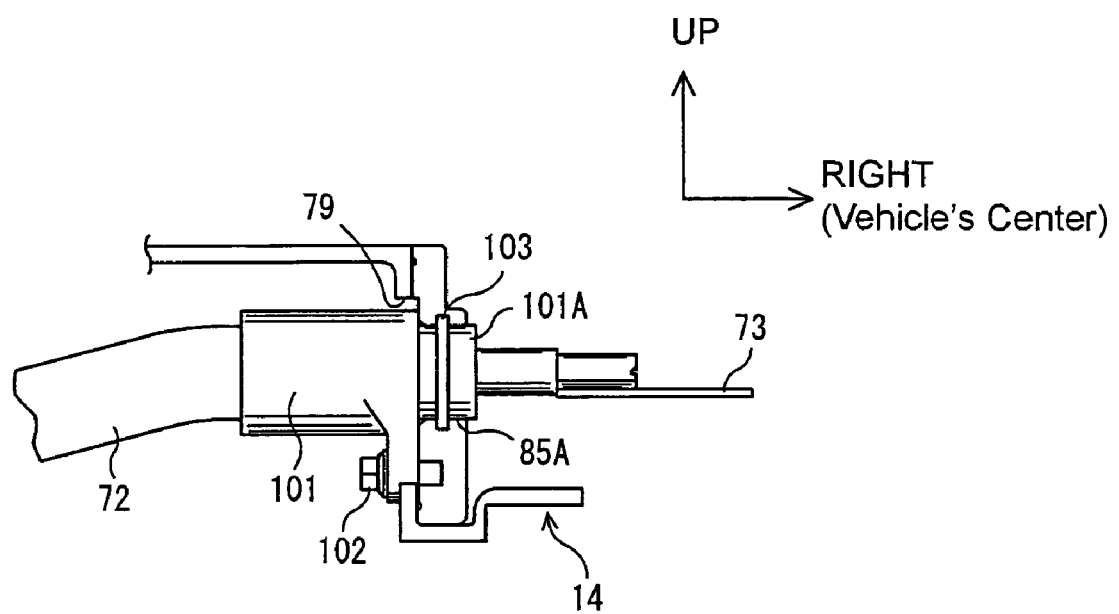
FIG. 18 is a cross-section view indicated XVIII-XVIII in FIG. 16 schematically showing a part of the structure in the embodiment of the present invention.

As shown in FIG. 15 and FIG. 18, each of the plate high-voltage cable hole portions 85A and 85B is a hole into which individual socket ends 101A and 101A of cable holders 101 and 101 are inserted. The plate high-voltage cable hole portions 85A and 85B are respectively communicated with the casing high-voltage cable hole portions 79 and 79 shown in FIG. 14.

Into the cable holders 101 and 101, each of the high-voltage cables 72 and 72 is individually inserted. Each of the socket ends 101A and 101A of the cable holders 101 and 101 has a rubber O-shaped ring 103 individually equipped to secure airtightness in the battery case 13.

The cable holders 101 and 101 are fixed to the cover plate 81 by holder fixing bolts 102 and 102, respectively. The holder fixing bolts 102 and 102 are bolts which are individually engaged with cable holder hole portions 86A and 86B.

The cable holder hole portions 86A and 86B are holes which are respectively formed adjacent to the plate high-voltage cable hole portions 85A and 85B. The cable holder hole portions 86A and 86B open to the front side of the cover plate 81 and do not open to the back side of the cover plate 81.

The inner surface of each of the plate high-voltage cable hole portions 85A and 85B is mirror finished so that the O-shaped ring 103 fits each of the plate high-voltage cable hole portions 85A and 85B without leaving a gap.

Further, because of the mirror finished inner surface, it is possible to protect the O-shaped ring 103 from any damage when the O-shaped ring 103 is inserted into each of the plate high-voltage cable hole portions 85A and 85B.

Additionally, a sealing groove 87 is formed around the outer edge of the cover plate 81. Sealing agent (not shown) is filled into sealing groove 87 avoid to leaving a gap between the concave side wall 29 of the battery tray 14 and the cover plate 81 as shown in FIG. 17.

Figure 19:
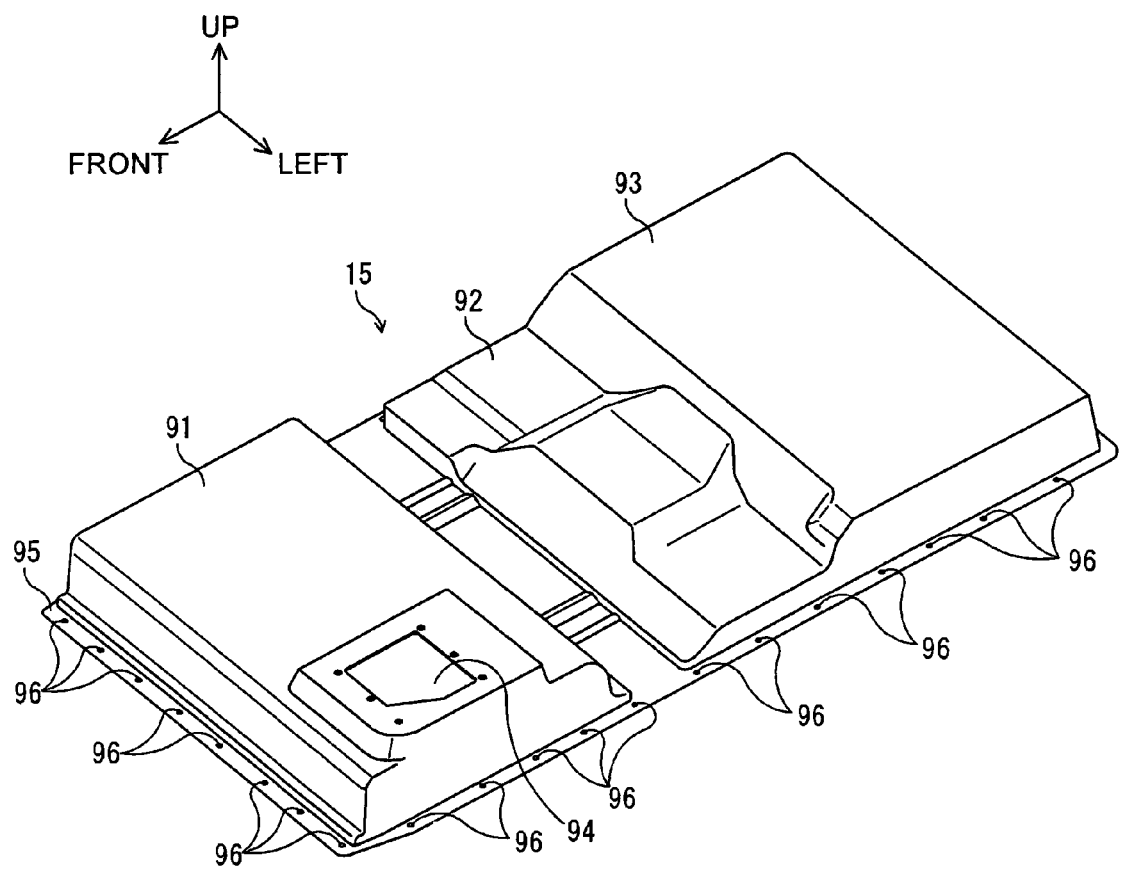
FIG. 19 is a perspective view schematically showing a battery cover in the embodiment of the present invention.
Figure 20:
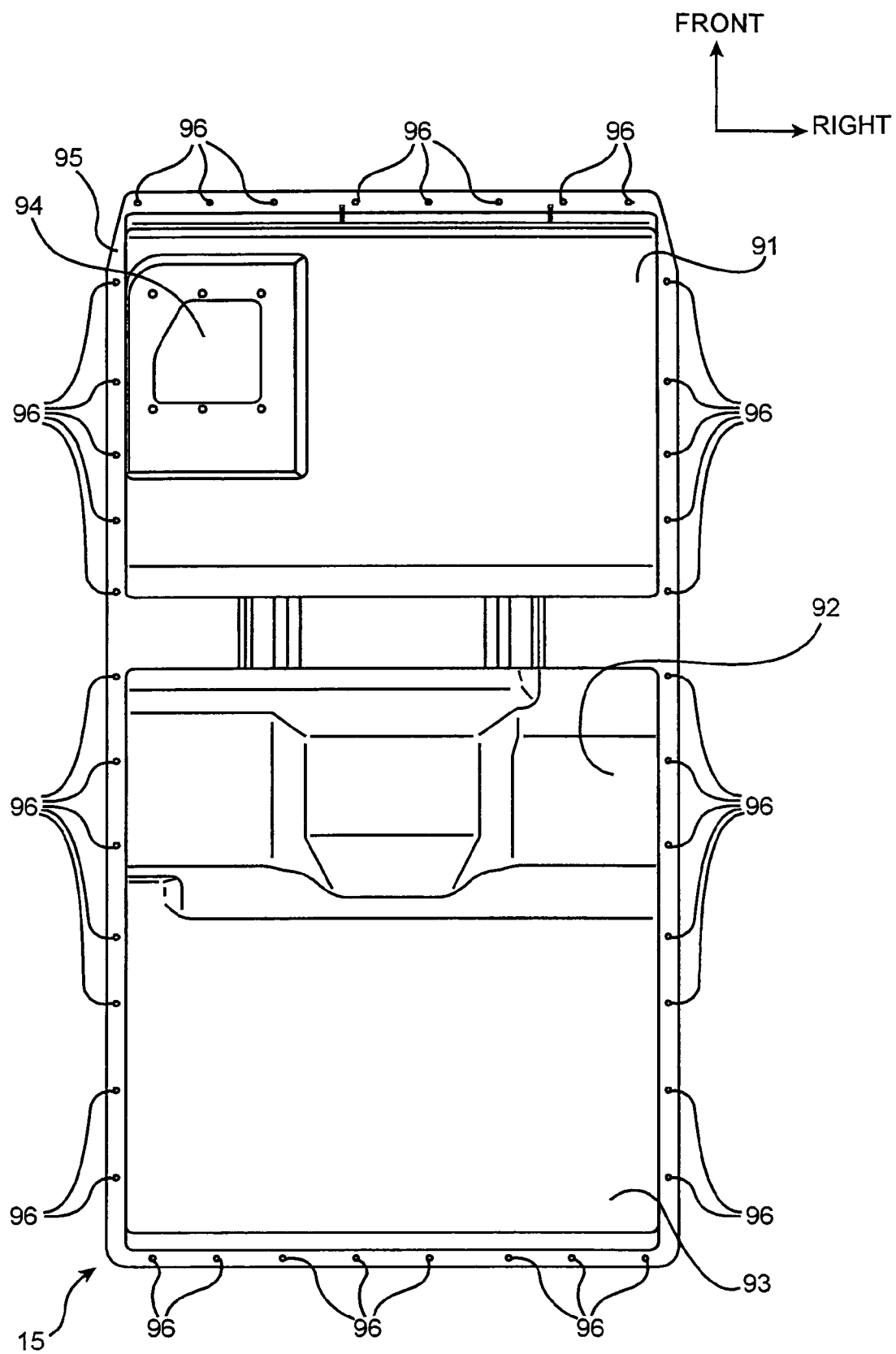
FIG. 20 is a top view schematically showing the battery cover in the embodiment of the present invention.

As shown in FIG. 19 and FIG. 20, the battery cover 13 has a front raised portion 91, a middle raised portion 92 and a rear raised portion 93.

The front raised portion 91 is a portion which is raised near the front end of the battery cover 13. The rear raised portion 93 is a portion which is raised near the rear end of the battery cover 13. On the front raised portion 91, a maintenance hole portion 94 is formed.

The maintenance hole portion 94 is formed for maintaining inside the battery case 13 and is normally covered by a covering plate (not shown).

The middle raised portion 92 is a portion which is raised between the front raised portion 91 and the rear raised portion 93, however, the middle raised portion 92 is lower than the front raised portion 91 and the rear raised portion 93 in height.

A flange 95, on which cover bolt hole portions 96 are formed, is formed around the edge of the battery cover 13.

As shown in FIG. 3, tray bolt hole portions 105, corresponding to the location of the cover bolt hole portions 96, are formed on the front-end wall 16, the left-end wall 17, right-end wall 18, and rear-end wall 19 of the battery tray 14 (namely, around the edge of battery tray 14).

According to this arrangement, the cover bolt hole portions 96 and the tray bolt hole portions 105 respectively communicate with each other when the battery cover 15 is put on the battery tray 14. Thus, it is allowed that bolts (not shown) are individually inserted into the cover bolt hole portions 96 and the tray bolt hole portions 105 to fix the battery tray 14 and the battery cover 15.

Namely, the embodiment of the present invention can provide the following effects or/and advantages.

For example, if the front side of the electric vehicle 10 is crashed, the battery case 13 containing batteries 20 moves forward due to inertia. Particularly, the batteries 20 are comparatively heavy, therefore, it is impossible to omit kinetic energy of the battery case 13 when the electric vehicle 10 is crashed.

However, according to the present invention in this embodiment, it is possible to avoid the battery case 13 moving forward and being crashed against the battery cross member 12 because the lateral-end supporting members 61A, 61B, 61C and 61D and the front-end supporting members 62A and 62B are provided.

Namely, it is possible to maintain the gap (see $G_F$ in FIG. 1) between the battery case 13 and the battery cross member 12 even if the electric vehicle 10 is crashed, and therefore, it is possible to avoid damage to cables (not shown) installed in the gap $G_F$ so that the reliability of the electric vehicle 10 is improved.

The front-end supporting members 62A and 62B are not connected to all of the lateral-end supporting members 61A, 61B, 61C and 61D, however, the front-end supporting members 62A and 62B are connected to only the lateral-end supporting member 61A which is disposed at the front row. Accordingly, it is possible to reduce the length of the front-end supporting members 62A and 62B, and therefore, it is possible to suppress the weight and cost of front-end supporting members 62A and 62B.

Namely, it is possible to improve crash-resisting capability of the batteries 20 mounted on the electric vehicle 10 while preventing increased weight and cost.

Further, the lateral-end supporting members 61A, 61B, 61C and 61D and front-end supporting members 62A and 62B are made from iron. In addition, the battery case 13 is made from polybutylene resin including glass fibers. According to this arrangement, it is possible to reduce the weight of the battery case 13 at a reasonably low cost in mass production. Further, it is also possible to improve the mounting stiffness of the battery case 13 in relation to the electric vehicle 10.

The battery case 13 containing the batteries 20 is robustly supported by the lateral-end supporting members 61A, 61B, 61C and 61D, and further, the front blocks 63A and 63B prevent collision of the battery case 13 with the battery cross member 12 if the battery case 13 moves forward due to inertia even if the front side of the vehicle 10 is crashed.

Further, the lateral clash-proof blocks 66A, 66B, 66C and 66D are inserted between the side surface of the battery case 13 and the side member 11, and accordingly, it is possible to avoid a collision of the battery case 13 with the side member 11 if the battery case 13 moves laterally due to inertia even if the lateral side of the vehicle 10 is crashed.

Namely, it is possible to keep the gap (see $G_S$ and $G_S$ in FIG. 1) between the battery case 13 and the side members 11 even if the electric vehicle 10 is crashed, therefore, it is possible to prevent damage of the high-voltage cables 72 and low-voltage cables 89 installed in the gap $G_S$ and $G_S$ so that the reliability of the electric vehicle 10 is improved.

Additionally, the lateral-end supporting members 61A, 61B, 61C and 61D and front-end supporting members 62A and 62B and battery cross member 12 are made from iron. Further, the battery case 13 is made from polybutylene resin including glass fibers.

According to this arrangement, it is possible to reduce the weight of the battery case 13 at a reasonably low cost in mass production. Further, it is also possible to improve the mounting rigidity of the battery case 13 on the electric vehicle 10.

The front-end supporting members 62A and 62B and the battery cross member 12 are connected via the front blocks 63A and 63B. Further, the lateral-end supporting members 61A, 61B, 61C and 61D and the side members 11 are connected via the lateral clash-proof blocks 66A, 66B, 66C and 66D. According to this arrangement, it is possible to lower the center of gravity of the battery case 13 containing the heavy batteries 20.

Further, due to inserting the front blocks 63A and 63B between the battery case 13 and the battery cross member 12 and inserting the lateral-end supporting members 61A, 61B, 61C and 61D between the battery case 13 and the side members 11, it is possible to avoid collisions between the cross member 12 or the side member 11 if the battery case 13 moves due to inertia even if the vehicle 10 is crashed.

Therefore, it is possible to improve the crash-resistant capability of the batteries 20 mounted on the electric vehicle 10.

Namely, if the front side of the electric vehicle 10 is crashed, it is possible to avoid collision with the battery cross member 12 if the battery case 13 moves forward due to inertia. Likewise, if the lateral side of the electric vehicle 10 is crashed, it is possible to avoid collision with the side members 11 if the battery case 13 moves laterally due to inertia.

As discussed previously with FIG. 9, the high-voltage cables 72 and 72 are individually inserted into the plate high-voltage cable hole portions 85A and 85B formed at the cover plates 81 respectively fixed on the dent portions 28A and 28B of the battery case 13. Further, the high-voltage cables 72 and 72, which are disposed between the side members 11 and the battery case 13, are curved in an arc shape with a bending radius.

Further, each of the concave side walls 29 of the dent portions 28A and 28B is distanced $L_5$, which is defined corresponding to the outer diameter $D_3$ of the high-voltage cable 72, from the side member 11. Accordingly, it is possible to avoid damaging the high-voltage cables 72 due to bending the high-voltage cables 72 with excessively small radius and it is also possible to avoid wasting the space in the battery case 13 due to curving the high-voltage cables 72 with excessively large radius.

In other words, it is possible to easily install the high-voltage cables 72 connected to the batteries 20 mounted on the electric vehicle 10 while utilizing limited space in the electric vehicle 10

Further, the high-voltage cables 72 are connected to the batteries 20 via the hole connectors 73, and accordingly, it is possible to secure the connection between the high-voltage cables 72 and the batteries 20 at a lower cost.

Particularly, it is possible to avoid unwanted disconnection of the high-voltage cables 72 from the batteries 20 in the battery case 13 due to using the hole connectors 73 to connect between the batteries 20 and the high cables 72 as compared with using conventional detachable connectors.

Therefore, it is possible to improve the reliability of the electric vehicle 10 by preventing accidental disconnection between the high-voltage cables 72 and the batteries 20.

Further, it is possible to reduce cost and weight of the electric vehicle 10 by using the hole connectors 73 as compared with using conventional detachable connectors.

Each of the high-voltage cables 72 is drawn from inside the battery case 13 through the plate high-voltage cable hole portions 85A and 85B formed at the aluminum cover plate 81, and accordingly, it is possible to avoid excessively varying the inner diameter of the plate high-voltage cable hole portions 85A and 85B due to variation of air temperature.

Further, it is possible to avoid external air flowing into the battery case 13 due to sealing by each O-shaped ring 103 between the outer surface of the high-voltage cables 72 and 72 and the inner surface of the plate high-voltage cable hole portions 85A and 85B.

Additionally, although the plate bolt-hole portions 82 open to the front side of the cover plate 81, the plate bolt-hole portions 82 do not open to the back side of the cover plate 81, and accordingly, it is possible to secure the airtightness in the battery case 13 while allowing the plate fixing bolts 104, for fixing the cover plate 81 to the battery case 13, to be engaged with the plate bolt-hole portions 82.

As shown in FIG. 6 and FIG. 7, portions whose outer diameter is locally small (second diameter $D_2$) at the built-in nut 51, namely, the upper constriction 55A and the lower constriction 55B in which resin of battery tray 14 is entered. Accordingly, it is possible to avoid the built-in nut 51 dropping from the battery tray 14 even if force is vertically inputted to the built-in nut 51.

Further, due to the serrated portion 53A formed on the middle stem 53, it is possible to avoid spinning of the built-in nut 51 embedded in the battery tray 14 even if torque is inputted to the built-in nut 51 to rotate the built-in nut 51 around the center axis $C_{51}$, accordingly, it is possible to surely engage the bolt (not shown) with the built-in nut 51.

From the present invention is not limited to the above embodiment, but covers all changes and modifications which do not constitute departures from the spirit and scope of the invention.

Figure 21:
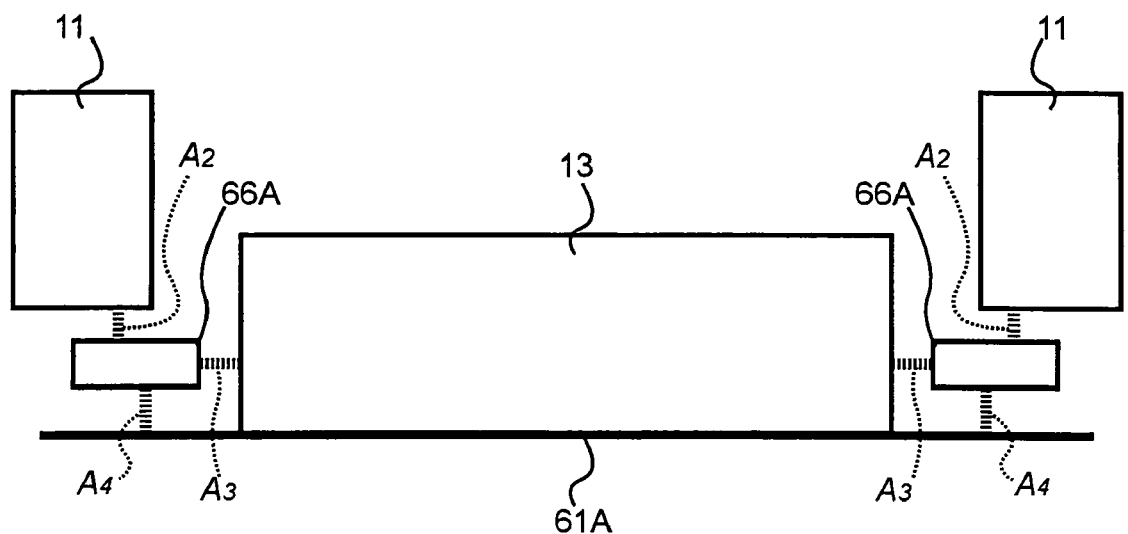
FIG. 21 is a front schematic view showing a structure of the present invention.

In the embodiment, as shown in FIG. 21, the A-supporting member 61A, which supports the bottom of the battery case 13, is connected to the A-lateral clash-proof block 66A (see $A_4$ in FIG. 21). Further, the A-lateral clash-proof block 66A is connected to the side member 11 (see $A_2$ in FIG. 21). Still further, the A-lateral clash-proof block 66A is also connected to the battery case 13 (see $A_3$ in FIG. 21).

Figure 22:
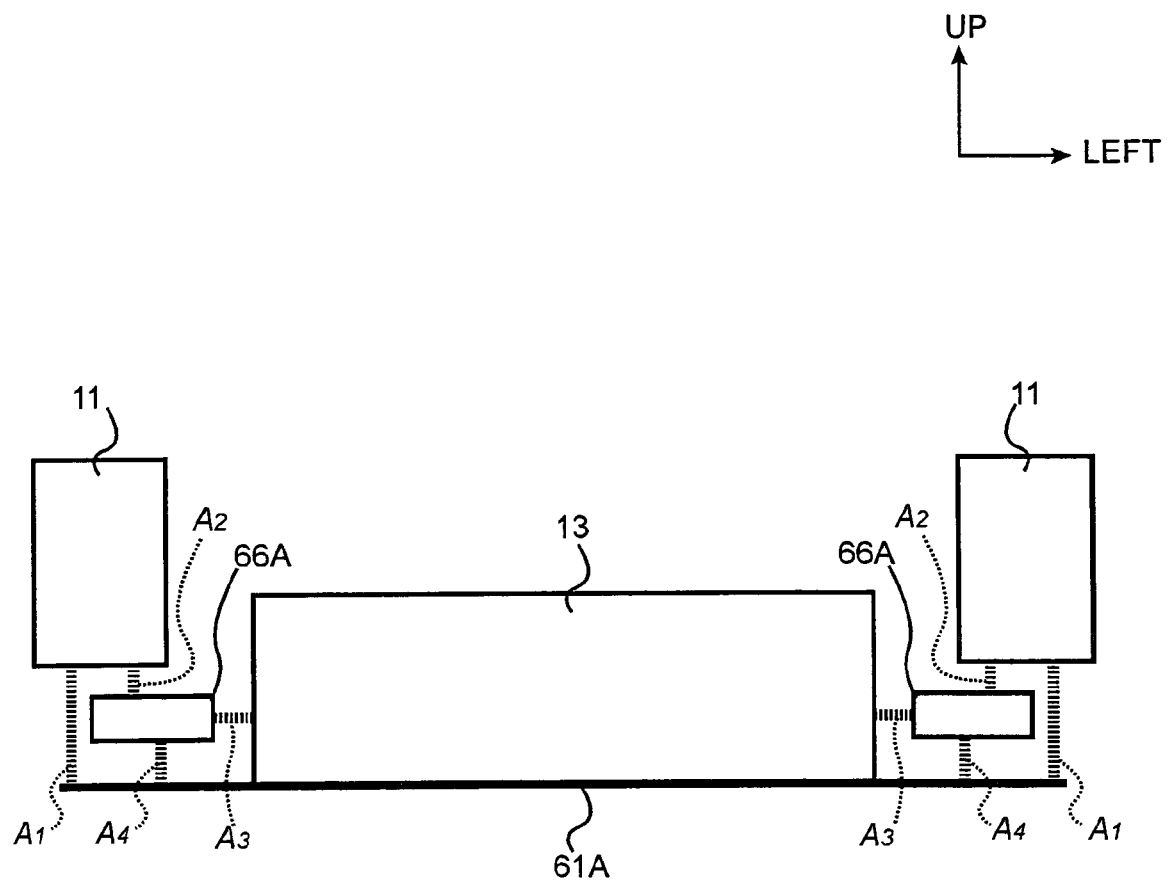
FIG. 22 is a front schematic view showing another structure of the present invention.

However, the present invention is not limited to this embodiment. For example, as shown in FIG. 22, in addition to the structure shown in FIG. 21, the A-supporting member 61A may be connected directly to the side member 11 (see A1 in FIG. 22).

According to this arrangement, it is possible to further improve the crash-resisting capability of the batteries.

Figure 23:
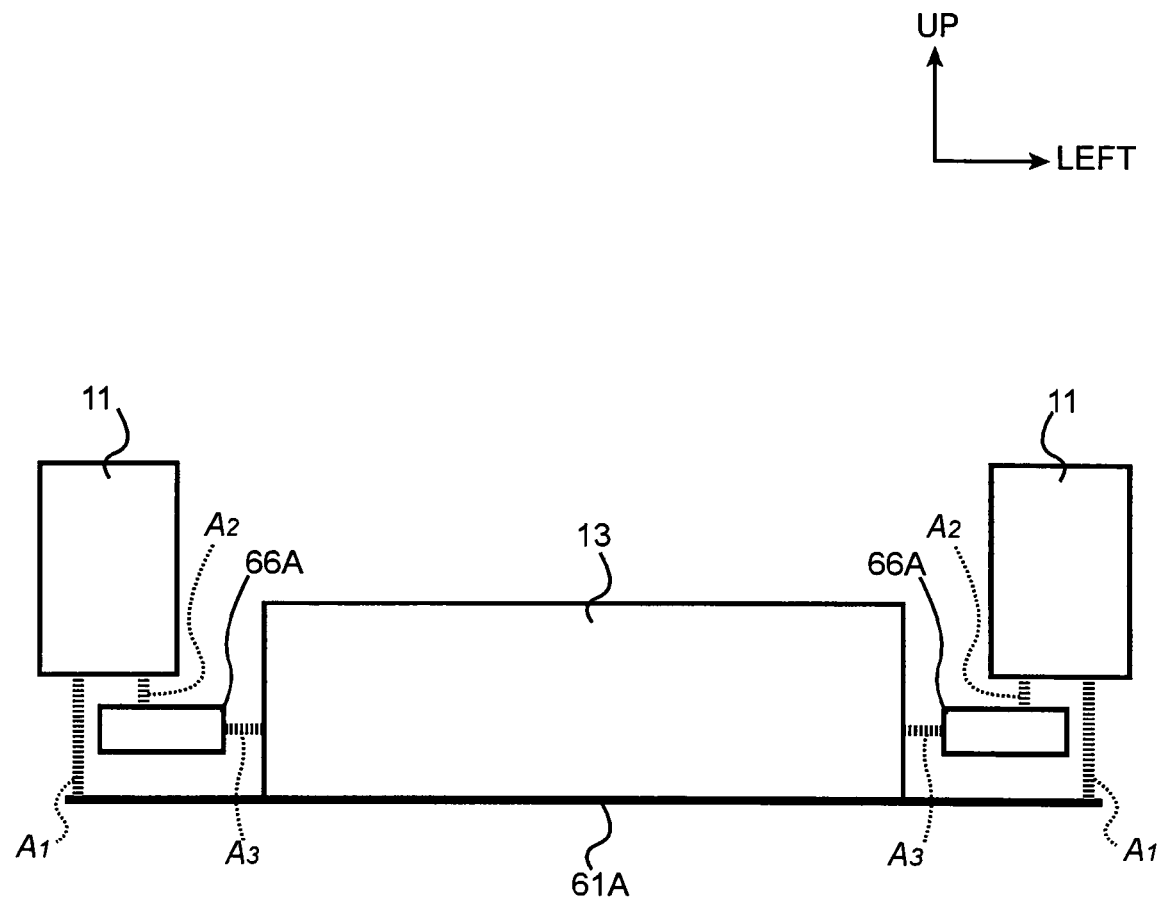
FIG. 23 is a front schematic view showing another structure of the present invention.

Additionally, as shown in FIG. 23, the A-supporting member 61A may be connected directly to the side member 11 (see $A_1$ in FIG. 22) and not be connected to the A-lateral clash-proof block 66A. Accordingly, it is possible to define the position of the A-lateral clash-proof block 66A irrespective of the position of the A-supporting member 61A.

The invention thus described, it will be obvious that the same may be varied in many ways. Such variations are not be regarded as a departure from the spirit and scope of the invention, and all such modifications as would be obvious to one skilled in the art are intended to be included within the scope of the following clams.

What is claimed is:

1. A structure for mounting a battery to an electric vehicle, comprising:
    a body member forming a body of the electric vehicle;
    a battery case containing the battery, said battery case having a front-end wall extending substantially in a vertical direction of the electric vehicle;
    a supporting member, which is connected to said body member, fixed to a bottom of said battery case; and
    a clash-proof block connecting between the battery case and the body member, wherein
    said body member includes,
        a pair of first body members extending in a longitudinal direction of said electric vehicle, and
        a second body member which extends in the transversal direction of the electric vehicle and provided across said pair of first body members, forming said body of said electric vehicle,
    said battery case is disposed between said pair of first body members and the rear of said second body member while forming a gap between said battery case and the rear of said second body member, and
    said clash-proof block includes a first clash-proof block attached to and extending from said front-end wall and connecting said front-end wall of said battery case to said second body member, said first clash-proof block maintaining the gap and preventing said battery case from colliding with said second body member,
    wherein said supporting member includes,
        a plurality of first supporting members which extend in the transversal direction of said electric vehicle and connects between said pair of first body members, and
        a second supporting member which extends in the longitudinal direction of the electric vehicle, and connects to only one of said first supporting members, which is disposed at the front row, to said second body member, and
    said supporting member and said clash-proof block are made of metal.

2. The structure for mounting the battery to the electric vehicle according to claim 1 wherein
    said first supporting members, being plate-shaped members, which are provided across said pair of first body members, supporting the bottom of said battery case.

3. The structure for mounting the battery to the electric vehicle according to claim 2 wherein
    said battery case is disposed between said pair of first body members and the rear of said second body member while forming a gap between said battery case and at least one of said pair of first body members, and
    said clash-proof block includes a second clash-proof block connecting a side surface of said battery case to said one of the pair of first body members, said second clash-proof block maintains the gap between said battery case and said one of the pair of first body members and prevents said battery case from colliding with said second body member.

4. The structure for mounting the battery to the electric vehicle according to claim 3 wherein
    said supporting member and said clash-proof block are made from metal, and
    said battery case is made from resin.

5. The structure for mounting the battery to the electric vehicle according to claim 2 wherein
    said supporting member and said clash-proof block are made from metal, and
    said battery case is made from resin.

6. The structure for mounting the battery to the electric vehicle according to claim 1 wherein
said clash-proof block includes a second clash-proof block connecting between said battery case and one of said pair of first body members.

7. The structure for mounting the battery to the electric vehicle according to claim 6 wherein
said supporting member and said clash-proof block are made from metal, and
said battery case is made from resin.

8. The structure for mounting the battery to the electric vehicle according to claim 1 wherein
said supporting member and said clash-proof block are made from metal, and
said battery case is made from resin.

9. The structure for mounting the battery to the electric vehicle according to claim 1 wherein
said supporting member and said clash-proof block are made from iron.

10. A structure for mounting a battery to an electric vehicle, comprising:
a battery case containing the battery, said battery case having a front-end wall extending substantially in a vertical direction of the electric vehicle;
a first supporting member, which extends in a transversal direction of the electric vehicle, for supporting said battery case on a pair of first body members extending in the longitudinal direction of the electric vehicle;
a second supporting member, which extends in a front direction of the electric vehicle from said first supporting member, for supporting said battery case on a second body member, said second body member extending in a transversal direction of the electric vehicle and connecting said pair of first body members, and forming a gap between said battery case and said second body member; and
a first clash-proof block attached to and extending from said front-end wall and connecting said front-end wall of said battery case to said second body member, said first clash-proof block maintaining the gap and preventing said battery case from colliding with said second body member.

11. The structure for mounting the battery to the electric vehicle according to claim 10 wherein
said first supporting member and said second supporting member are fixed to a bottom of said battery case.

12. The structure for mounting the battery to the electric vehicle according to claim 10, wherein
said first supporting member supports said battery case on said pair of first body members while forming a gap between said battery case and at least one of said pair of first body members,
the structure further comprising:
a second clash-proof block connecting a side surface of said battery case to said one of the pair of first body members, said second clash-proof block maintains the gap between said battery case and said one of the pair of first body members and preventing said battery case from colliding with said one of the pair of first body members.

13. The structure for mounting the battery to the electric vehicle according to claim 12 wherein
said first supporting member, said second supporting member, said first clash-proof block, and said second clash-proof block are made from metal, and
said battery case is made from resin.

14. The structure for mounting the battery to the electric vehicle according to claim 10 wherein
said first clash-proof block is attached to said second supporting member.

15. The structure for mounting the battery to the electric vehicle according to claim 10 wherein
said second supporting member is attached to said second body member via said first clash-proof block.

* * * * *